US012226027B2

(12) United States Patent
Park

(10) Patent No.: US 12,226,027 B2
(45) Date of Patent: Feb. 18, 2025

(54) UNIT CHAIR

(71) Applicant: OSSTEMIMPLANT CO., LTD., Seoul (KR)

(72) Inventor: Sang Yong Park, Goyang-si (KR)

(73) Assignee: OSSTEMIMPLANT CO., LTD., Seoul (KR)

( * ) Notice: Subject to any disclaimer, the term of this patent is extended or adjusted under 35 U.S.C. 154(b) by 428 days.

(21) Appl. No.: 17/761,266

(22) PCT Filed: Sep. 11, 2020

(86) PCT No.: PCT/KR2020/012344
§ 371 (c)(1),
(2) Date: Mar. 17, 2022

(87) PCT Pub. No.: WO2021/054685
PCT Pub. Date: Mar. 25, 2021

(65) Prior Publication Data

US 2022/0370277 A1 Nov. 24, 2022

(30) Foreign Application Priority Data

Sep. 17, 2019 (KR) ........................ 10-2019-0114189
Sep. 17, 2019 (KR) ........................ 10-2019-0114205
Sep. 17, 2019 (KR) ........................ 10-2019-0114225

(51) Int. Cl.
*A47C 7/38* (2006.01)
*A47C 1/00* (2006.01)
(Continued)

(52) U.S. Cl.
CPC .................. *A47C 7/38* (2013.01); *A47C 1/00* (2013.01); *A61G 15/02* (2013.01); *A61G 15/125* (2013.01)

(58) Field of Classification Search
CPC ......... A47C 7/38; A47C 7/5066; A47C 7/541; A61G 15/125; Y10T 403/32368
(Continued)

(56) References Cited

U.S. PATENT DOCUMENTS 4,614,452 A * 9/1986 Wang ...................... F16C 11/10 403/97
5,279,387 A * 1/1994 Swiderski ................ E06C 1/39 182/27
(Continued)

FOREIGN PATENT DOCUMENTS

DE 202016100901 U1 * 5/2016
JP 2018-000331 A 1/2018
(Continued)

*Primary Examiner* — David E Allred
(74) *Attorney, Agent, or Firm* — Bridgeway IP Law Group, PLLC; Sang Ho Lee; Hyun Woo Shin

(57) ABSTRACT

The present disclosure relates to a unit chair. The unit chair includes a link unit for adjusting a posture of a headrest, wherein the link unit includes: a first link member fixed to a backrest portion of the unit chair; a second link member having one end portion hinged to the first link member by a first hinge pin; and a first ratchet member formed on one surface of at least one of the first link member and the second link member and constraining motion of the second link member so that the second link member is rotatable only in one direction based on a central axis line of the first hinge pin, wherein the first ratchet member includes a first ratchet base portion including a plurality of saw teeth formed on one surface, arranged in a ring shape based on the central axis line of the first hinge pin, uplifted in a direction toward the central axis line, and inclined only in one direction, and
(Continued)

having an opposite surface fixed to the first link member; and a first ratchet rotating portion including a plurality of saw teeth formed on one surface and at least partially engaged with at least some of the saw teeth of the first ratchet base portion and having an opposite surface fixed to the second link member.

42 Claims, 12 Drawing Sheets

(51) Int. Cl.
*A61G 15/02* (2006.01)
*A61G 15/12* (2006.01)

(58) Field of Classification Search
USPC .......................................................... 248/118
See application file for complete search history.

(56) References Cited

U.S. PATENT DOCUMENTS

| | | | | |
|---|---|---|---|---|
| 6,739,006 | B2 * | 5/2004 | Borders | A61G 13/08 5/622 |
| 7,093,313 | B2 * | 8/2006 | DeBraal | A61G 13/121 5/643 |
| 7,610,639 | B2 * | 11/2009 | Roleder | A47G 9/1054 5/640 |
| 7,871,130 | B2 | 1/2011 | da Silva Netto et al. | |
| 7,896,569 | B2 * | 3/2011 | Katzenstein | A61G 13/12 403/101 |
| 8,876,210 | B2 * | 11/2014 | Magstadt | A61G 15/125 297/409 |

FOREIGN PATENT DOCUMENTS

| | | | |
|---|---|---|---|
| KR | 10-1997-0010326 | A | 3/1997 |
| KR | 10-2009-0047671 | A | 5/2009 |
| KR | 10-1144623 | B1 | 5/2012 |

* cited by examiner

UNIT CHAIR

TECHNICAL FIELD

The present disclosure relates to a unit chair.

BACKGROUND ART

A unit chair is a device for accommodating an examinee at the dentist's office, etc., and generally includes a backrest for supporting the examinee's back and a seat (leg rest) for supporting the buttocks and legs. In addition, the unit chair may further include a headrest for supporting the examinee's head, a doctor table (i.e., an instrument tray) for holding dental tools such as a handpiece for the examinee's treatment, or a cuspidor, a watering table, etc.

The seat is supported by a base placed on a floor surface of a dental treatment space. At least one of the base and the seat may include a driving unit for adjusting a height of the seat.

The backrest may be coupled to one end of the seat and perform a tilting operation with respect to the seat. By tilting the backrest to stand forward, the examinee may be placed in a seated state, and by tilting the backrest to be reversed backward, the examinee may be placed in a lying state, thereby obtaining the suitable posture of the examinee for medical treatment situations.

The headrest is formed at an upper end of the backrest and an angle thereof may be adjusted according to the purpose of a treatment, a body type of a patient, and the convenience of medical staff. In a situation of a treatment that requires adjustment of the angle of the headrest, the medical staff is holding a treatment tool in one hand so that he/she may not use both hands freely or the examinee's head is applying a load to the headrest in many cases.

Therefore, in the case of adjusting the angle or posture of the headrest in a direction in which the examinee bows or advances his/her head, it is preferred for the angle to be adjusted by lightly pushing the headrest with one hand without operating a separate button or lever. Or, conversely, the angle may be adjusted in a direction in which the examinee's head is erected (reverse direction) only by operating a separate button or lever, and otherwise, it is better to firmly support the head.

The design of the button or lever is very important. Reliability should be ensured so that the angle may be adjusted in the reverse direction only when the button or lever is pressed with an appropriate force. In addition, in that the doctor's hand motions are often made near the headrest in terms of the characteristics of dental treatment, a malfunction caused as a hand touches the button or lever may lead to an injury of the examinee, which, thus, requires attention. Therefore, there is a need for a safety measure capable of effectively preventing a malfunction.

However, as described above, it is not easy to ensure durability in a structure that allows angle adjustment in only one direction and supports the examinee's head in the reverse direction.

Further, in addition to guaranteeing durability, it is necessary to propose a structure that may adjust a posture of a headrest more precisely, may solve side effects such as sticking between the parts constituting the structure, and may be easy to manufacture.

In addition, it is necessary to provide a support structure for the headrest that may take postures corresponding to body types of examinees of various heights, including very short examinees such as children, while adopting the structure in which the angle may be adjusted only in one direction.

DISCLOSURE

Technical Problem

An aspect of the present disclosure provides a unit chair in which an angle of a headrest may be adjusted in a forward direction, while durability of a structure is supported when a force is applied in a reverse direction.

Another aspect of the present disclosure provides a support structure of a headrest that may precisely adjust a posture of the headrest and solve side effects thereof.

Another aspect of the present disclosure provides a support structure for a headrest that is easy to manufacture through injection molding, while simplifying the number of parts.

Another aspect of the present disclosure provides a support structure for a headrest that may take a posture corresponding to a body type of an examinee of various heights accommodated in a unit chair.

Another aspect of the present disclosure provides a support structure for a two-joint headrest that may adjust an angle in one direction, while independently releasing a motion constraint state of the two joints, and may adjust the angle in one direction.

Another aspect of the present disclosure provides a unit chair having a structure that enables adjustment of a forward posture of a headrest and supports and fixes the headrest when a force is applied in a reverse direction.

Another aspect of the present disclosure provides a safety device for a unit chair, which prevents a malfunction of a function of releasing, as needed, a state in which a headrest is supported and fixed when a force in the reverse direction is applied.

Technical Solution

According to an embodiment of the present disclosure, a unit chair includes a link unit for adjusting a posture of a headrest, wherein the link unit includes: a first link member fixed to a backrest portion of the unit chair; a second link member having one end portion hinged to the first link member by a first hinge pin; and a first ratchet member formed on one surface of at least one of the first link member and the second link member and constraining motion of the second link member so that the second link member is rotatable only in one direction based on a central axis line of the first hinge pin, wherein the first ratchet member includes a first ratchet base portion including a plurality of saw teeth formed on one surface, arranged in a ring shape based on the central axis line of the first hinge pin, uplifted in a direction toward the central axis line, and inclined only in one direction, and having an opposite surface fixed to the first link member; and a first ratchet rotating portion including a plurality of saw teeth formed on one surface and at least partially engaged with at least some of the saw teeth of the first ratchet base portion and having an opposite surface fixed to the second link member.

The unit chair may further include: a third link member having one end portion hinged to the other end portion of the second link member by a second hinge pin and allowing the headrest to be fixed to one surface thereof; and a second ratchet member formed on one surface of at least one of the second link member and the third link member and constraining motion of the third link member so that the third link member is rotatable only in one direction based on a central axis line of the second hinge pin.

The second link member may include a first release portion transmitting an external force to the first ratchet member to release the motion constraint state of the second link member; and a second release portion operating independently from the first release portion and transmitting an external force to the second ratchet member to release a motion constraint state of the third link member.

The second link member may include a first release portion transmitting an external force to the first ratchet member to release the motion constraint state of the second link member, wherein the first ratchet member constrains motion of the second link member so that the second link member is rotatable only in one direction based on the central axis line of the first hinge pin as the saw teeth of the first ratchet base portion are engaged with the saw teeth of the first ratchet rotating portion, and the first release portion releases the motion constraint state of the second link member by releasing the engagement of the first ratchet member when an external force is applied.

The second ratchet member may include: a second ratchet base portion including a plurality of saw teeth formed on one surface, arranged in a ring shape based on a central axis line of the second hinge pin, uplifted in a direction toward the central axis line, and inclined only in one direction, and having an opposite surface fixed to the third link member; and a second ratchet rotating portion including a plurality of saw teeth formed on one surface and at least partially engaged with at least some of the saw teeth of the second ratchet base portion and having an opposite surface fixed to the second link member.

The second link member may include a first release portion transmitting an external force to the first ratchet member to release the motion constraint state of the second link member, wherein the first release portion may include: a first button protruding from an external side surface of the second link member and receiving an external force applied thereto; and a first operating member formed inside the second link member and supported by a first elastic member, having one surface to which the first button and the first ratchet rotating portion are fixed, and integrally moving together with the first button and the first ratchet rotating portion to separate the first ratchet rotating portion from the first ratchet base portion when an external force is applied to the first button.

Each saw tooth of each of the first ratchet base portion and the first ratchet rotating portion may be at an inclination angle of 40 degrees to 50 degrees only in one direction with respect to a surface on which each saw tooth is formed.

The inclination angle may be 45 degrees.

Any one of the number of saw teeth of the first ratchet base portion and the number of saw teeth of the first ratchet rotating portion may be a multiple of 2 or greater of the other.

The number of saw teeth of the first ratchet rotating portion may be twice the number of saw teeth of the first ratchet base portion.

The saw teeth of the first ratchet rotating portion may be provided in plurality, and the plurality of saw teeth may be arranged in a ring shape at equiangular intervals.

The second link member may be constrained in motion by the first ratchet member and may be rotatable only in a direction toward a seat surface of the backrest portion, and the third link member may be constrained in motion by the second ratchet member so that the third link member is rotatable only in a direction opposite to a direction in which the second link member is rotatable.

The second release portion include: a second button protruding from an external side surface of the second link member and receiving an external force applied thereto; and a second operating member formed inside the second link member and supported by a second elastic member, having one surface to which the second button and the second ratchet rotating portion are fixed, and integrally moving together with the second button and the second ratchet rotating portion to separate the second ratchet rotating portion from the second ratchet base portion when an external force is applied to the second button.

A surface becoming a front end when the second link member rotates in one direction, in an external surface of the second link member is recessed when observed in a direction of a central axial line of the first hinge pin.

When the first link member is fixed to the backrest portion, the other end portion of the second link member, rather than the one end portion of the second link member, contacts a seat surface of the backrest portion.

According to another embodiment of the present disclosure, a unit chair includes a link unit for adjusting a posture of a headrest, wherein the link unit includes: a first link member fixed to a backrest portion of the unit chair; a second link member having one end portion hinged to the first link member by a first hinge pin; a third link member having one end portion hinged to the other end portion of the second link member and allowing the headrest to be fixed to one surface thereof; a first ratchet member formed on one surface of at least one of the first link member and the second link member, constraining motion of the second link member so that the second link member is rotatable only in one direction based on a central axis line of the first hinge pin according to engagement of saw teeth having an inclined shape and facing each other; and a second ratchet member formed on one surface of at least one of the second link member and the third link member and constraining motion of the third link member so that the third link member is rotatable only in one direction based on a central axis line of the second hinge pin according to engagement of the saw teeth having an inclined shape and facing each other, and wherein the second link member includes a release portion releasing the motion constraint state of the second link member by transmitting an external force to the first ratchet member.

The release portion includes: a first release portion releasing the motion constraint state of the second link member by transmitting an external force to the first ratchet member; and a second release portion operating independently from the first release portion and releasing the motion constraint state of the third link member by transmitting an external force to the second ratchet member.

The first release portion releases the motion constraint state of the second link member by releasing the engagement of the saw teeth of the first ratchet member when an external force is applied, and the second release portion releases the motion constraint state of the third link member by releasing the engagement of the saw teeth of the second ratchet member when an external force is applied.

The first ratchet member includes: a first ratchet base portion including a plurality of saw teeth formed on one surface, arranged in a ring shape based on the central axis line of the first hinge pin, uplifted in a direction toward the central axis line, and inclined only in one direction, and having an opposite surface fixed to the first link member; and a first ratchet rotating portion including a plurality of saw teeth formed on one surface and at least partially engaged with at least some of the saw teeth of the first ratchet base portion and having an opposite surface fixed to the second link member, and the second ratchet member includes: a second ratchet base portion including a plurality of saw teeth formed on one surface, arranged in a ring shape based on a central axis line of the second hinge pin, uplifted in a direction toward the central axis line, and inclined only in one direction, and having an opposite surface fixed to the third link member; and a second ratchet rotating portion including a plurality of saw teeth formed on one surface and at least partially engaged with at least some of the saw teeth of the second ratchet base portion and having an opposite surface fixed to the second link member.

Each saw tooth of each of the first ratchet base portion, the first ratchet rotating portion, the second ratchet base portion, and the second ratchet rotating portion is at an inclination angle of 40 degrees to 50 degrees only in one direction with respect to a surface on which each saw tooth is formed.

The inclination angle is 45 degrees.

Any one of the number of saw teeth of the first ratchet base portion and the number of saw teeth of the first ratchet rotating portion is a multiple of 2 or greater of the other, or any one of the number of saw teeth of the second ratchet base portion and the number of saw teeth of the second ratchet rotating portion is a multiple of 2 or greater of the other.

The number of saw teeth of the first ratchet rotating portion may be double the number of saw teeth of the first ratchet base portion, and the number of saw teeth of the second ratchet rotating portion is double the number of saw teeth of the second ratchet base portion.

The saw teeth of the first ratchet rotating portion and the saw teeth of the second ratchet rotating portion may be provided in plurality, and the plurality of saw teeth may be arranged in a ring shape at equiangular intervals.

The second link member is constrained in motion by the first ratchet member and is rotatable only in a direction toward a seat surface of the backrest portion, and the third link member is constrained in motion by the second ratchet member so that the third link member is rotatable only in a direction opposite to a direction in which the second link member is rotatable.

The first release portion includes: a first button protruding from an external side surface of the second link member and receiving an external force applied thereto; and a first operating member formed inside the second link member and supported by a first elastic member, having one surface to which the first button and the first ratchet rotating portion are fixed, and integrally moving together with the first button and the first ratchet rotating portion to separate the first ratchet rotating portion from the first ratchet base portion when an external force is applied to the first button, and the second release portion includes: a second button protruding from an external side surface of the second link member and receiving an external force applied thereto; and a second operating member formed inside the second link member and supported by a second elastic member, having one surface to which the second button and the second ratchet rotating portion are fixed, and integrally moving together with the second button and the second ratchet rotating portion to separate the second ratchet rotating portion from the second ratchet base portion when an external force is applied to the second button.

A surface becoming a front end when the second link member rotates in one direction, in an external surface of the second link member, is recessed when observed in a direction of a central axial line of the first hinge pin.

The second link member has a "C" shape.

When the first link member is fixed to the backrest portion, the other end portion of the second link member may contact a seat surface of the backrest portion.

At least one of the first release portion and the second release portion includes a button moving along a trace including the central axis line of the first hinge pin or the central axis line of the second hinge pin when an external force is applied.

The second release portion includes a second button moving, while pushing at least a portion of the second ratchet member, along a trace including the central axis line of the first hinge pin to release the engagement of the saw teeth of the second ratchet member to release the motion constraint state of the third link member, when an external force is applied.

The first release portion may include: a first button protruding from one external side surface of the second link member and moving along a trace not including the central axis line of the first hinge pin and in parallel with the central axis line of the first hinge pin, when an external force is applied; and a first operating member formed inside the second link member, supported by a first elastic member, and integrally moving with the first button to release the engagement of the first ratchet member to release the motion constraint state of the second link member when an external force is applied.

According to another embodiment of the present disclosure, a unit chair includes a link unit for adjusting a posture of a headrest, wherein the link unit includes: a first link member fixed to a backrest portion of the unit chair; a second link member having one end portion hinged to the first link member by a first hinge pin; and a first ratchet member formed on one surface of at least one of the first link member and the second link member and constraining motion of the second link member so that the second link member is rotatable only in one direction based on a central axis line of the first hinge pin, wherein the second link member includes a first release portion releasing the motion constraint state of the second link member by transmitting an external force to the first ratchet member, and the first release portion includes a first deformation member changed in shape or position as an external force is applied, and the external force applied to the first ratchet member is transmitted only when a change amount of the shape or position of the first deformation member exceeds a predetermined first reference amount.

The first release portion further includes a first operating member formed inside the second link member and supported by a (1-1)-th elastic member, wherein the first deformation member includes a first button protruding from one external side surface of the second link member and supported by a (1-2)-th elastic member, and wherein the first operating member may transmit the applied external force to the first ratchet member only when the first button moves more than a first reference displacement as an external force is applied to the first button.

When the first button moves more than the first reference displacement as an external force is applied, the first operating member may be in contact and interwork with the first button.

A first uplift portion penetrating a hole formed in the first operating member is formed on an inner side of a housing of the second link member, and an outer wall of the first uplift portion guides a motion direction of the first operating member.

The first uplift portion has a first guide recess guiding a motion direction of the first button.

One end of the (1-2)-th elastic member is connected to the first uplift portion and the other end of the (1-2)-th elastic member is connected to the first button to support the first button and may be deformed according to a motion operation of the first button.

The first ratchet member includes a first ratchet base portion including a plurality of saw teeth formed on one surface, arranged in a ring shape based on the central axis line of the first hinge pin, uplifted in a direction toward the central axis line, and inclined only in one direction, and having an opposite surface fixed to the first link member; and a first ratchet rotating portion including saw teeth formed on one surface and engaged with the saw teeth of the first ratchet base portion and having an opposite surface fixed to the first operating member, and wherein the first operating member is moved together with the first button and the first ratchet rotating portion to separate the first ratchet rotating portion from the first ratchet base portion when an external force is applied to the first button.

The link unit further includes: a third link member having one end portion hinged to the other end portion of the second link member by a second hinge pin and allowing the headrest to be fixed to one surface thereof; and a second ratchet member formed on one surface of at least one of the second link member and the third link member and constraining motion of the third link member so that the third link member is rotatable only in one direction based on a central axis line of the second hinge pin, wherein the second link member further includes a second release portion operating independently from the first release portion and transmitting an external force to the second ratchet member to release a motion constraint state of the third link member, and wherein the second release portion includes a second deformation member changed in shape or position as an external force is applied, and the external force applied to the second ratchet member is transmitted only when a change amount of the shape or position of the second deformation member exceeds a predetermined second reference amount.

The second release portion further includes a second operating member formed inside the second link member and supported by a (2-1)-th elastic member, wherein the second deformation member includes a second button protruding from one external side surface of the second link member and supported by a (2-2)-th elastic member, and wherein the second operating member may transmit the applied external force to the second ratchet member only when the second button moves more than a second reference displacement as an external force is applied to the second button.

When the second button moves more than the second reference displacement as an external force is applied, the second operating member is in contact and interwork with the second button, wherein the second ratchet member includes: a second ratchet base portion including a plurality of saw teeth formed on one surface, arranged in a ring shape based on a central axis line of the second hinge pin, uplifted in a direction toward the central axis line, and inclined only in one direction, and having an opposite surface fixed to the third link member; and a second ratchet rotating portion including saw teeth formed on one surface and engaged with the saw teeth of the second ratchet base portion and having an opposite surface fixed to the second operating member, and wherein the second operating member is moved together with the second button and the second ratchet rotating portion to separate the second ratchet rotating portion from the second ratchet base portion when an external force is applied to the second button.

The second link member is constrained in motion by the first ratchet member and is rotatable only in a direction toward a seat surface of the backrest portion, and the third link member is constrained in motion by the second ratchet member so that the third link member is rotatable only in a direction opposite to a direction in which the second link member is rotatable.

Advantageous Effects

According to various embodiments of the present disclosure, a structure in which an angle of a headrest of a unit chair can be easily adjusted with one hand in a forward direction and the headrest is firmly supported when a force is applied in a reverse direction may be provided.

In addition, according to various embodiments of the present disclosure, durability of the structure in which a posture of the headrest in the forward direction is adjustable and the headrest may be supported and fixed when a force is applied in the reverse direction may be secured.

In addition, according to various embodiments of the present disclosure, a malfunction of a function of releasing a state in which the headrest is supported and fixed, as needed, when a force in the reverse direction is applied may be effectively prevented.

In addition, according to various embodiments of the present disclosure, it is possible to precisely adjust the posture of the headrest in response to a body shape of various examinees accommodated in the unit chair, while side effects such as sticking between parts constituting a support structure of the headrest may be addressed.

In addition, according to various embodiments of the present disclosure, it is possible to provide a support structure of the headrest that is easy to manufacture through injection molding, while simplifying the number of parts by excluding complicated parts such as a gas spring or a leaf spring.

In addition, according to various embodiments of the present disclosure, it is possible to take the posture of the headrest in response to a body type of the examinee of various heights accommodated in the unit chair.

In addition, according to various embodiments of the present disclosure, it is possible to implement a support structure of a two-joint headrest capable of adjusting an angle in one direction, while independently releasing a motion constraint state of the two joints.

BEST MODE

The following description illustrates only a principle of the present disclosure. Therefore, those skilled in the art may implement the principle of the present disclosure and devise various apparatuses included in the spirit and scope of the present disclosure although not clearly described or shown in the present specification. In addition, it is to be understood that all conditional terms and embodiments mentioned in the present specification are obviously intended only to allow those skilled in the art to understand a concept of the present disclosure in principle, and the present disclosure is not limited to embodiments and states particularly mentioned as such.

Further, it is to be understood that all detailed descriptions mentioning specific embodiments of the present disclosure as well as principles, aspects, and embodiments of the present disclosure are intended to include structural and functional equivalences thereof. Further, it is to be understood that these equivalences include an equivalence that will be developed in the future as well as an equivalence that is currently well-known, that is, all devices devised so as to perform the same function regardless of a structure.

The above-mentioned objects, features, and advantages will become obvious from the following detailed description provided in relation to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make unclear the gist of the present disclosure, it will be omitted.

Hereinafter, various embodiments of the present disclosure will be described in detail with reference to the accompanying drawings.

A unit chair 10 according to an embodiment of the present disclosure is a device that is installed on the floor of a dental treatment space and allows an examinee to sit on or lie down during treatment. The unit chair 10 may have a shape corresponding to a body shape so that the examinee does not feel discomfort during treatment.

Figure 1:
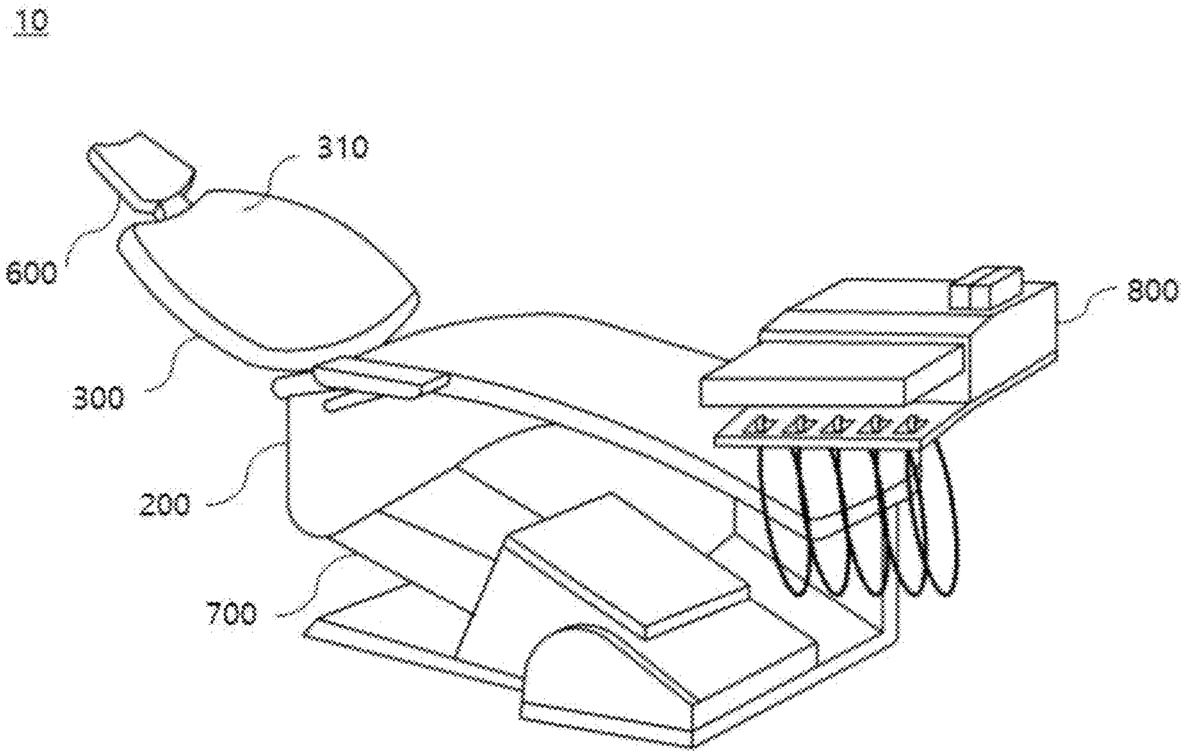
FIG. 1 is a perspective view of a unit chair according to an embodiment of the present disclosure.
Figure 2:
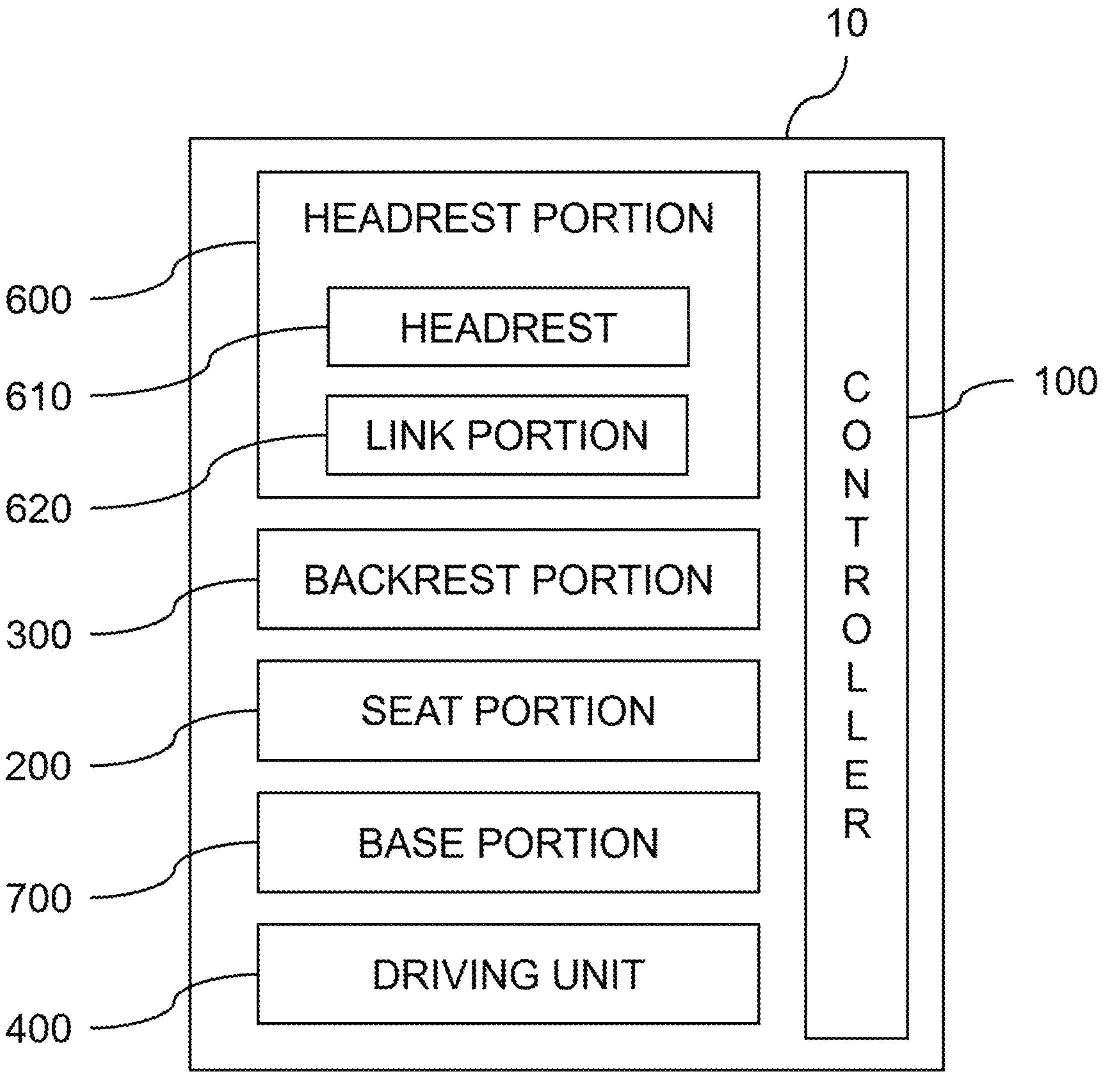
FIG. 2 is a block diagram illustrating a configuration of a unit chair according to an embodiment of the present disclosure.

FIG. 1 is a perspective view of a unit chair according to an embodiment of the present disclosure, and FIG. 2 is a block diagram illustrating a configuration of a unit chair according to an embodiment of the present disclosure.

As shown in these drawings, the unit chair 10 according to an embodiment of the present disclosure basically includes a seat portion 200 on which the examinee's legs are mounted and a backrest portion 300 on which the examinee's backrests.

In addition, the unit chair 10 may include a headrest portion 600 supporting the examinee's head, a base portion 700 supporting the seat portion 200, a driving unit 400 driving at least one of the backrest portion 300 and the seat portion 200, and a controller 100 controlling the driving unit 400. An armrest on which an examinee's arm is mounted may be formed on a side surface of at least one of the backrest portion 300 and the seat portion 200.

In addition, the unit chair 10 may include an associated device. For example, the associated device may include a treatment table portion 800 having an interface for operating an instrument or holding a treatment instrument, treatment chart, and the like for the examinee's treatment. In addition, the associated device may include at least one of a lighting unit (not shown) for illuminating the examinee, a water supply unit (not shown) for supplying gargle water for rinsing the examinee's mouth, a control unit (not shown), a display unit (not shown), a foot control unit (not shown), and a power supply unit (not shown).

The seat portion 200 may be a portion in contact with the examinee's lower body including the buttocks. The seat portion 200 may be supported by the base portion 700. A leg rest (not shown) supporting the examinee's foot may be coupled to the end of the seat portion 200. The leg rest (not shown) coupled to the seat portion 200 may have an angle and/or distance adjusted as needed.

For the convenience of medical practitioners and examinees, one portion of the unit chair 10 may operate separately from other portions.

The backrest portion 300 may be a portion in contact with the examinee's back part. A headrest portion 600 may be connected to an upper side of the backrest portion 300. An angle of the headrest portion 600 connected to the backrest portion 300 may be adjusted as needed. The angle of the headrest portion 600 may be electrically and/or manually adjusted. The backrest portion 300 may be coupled to the seat portion 200 and/or the base portion 700.

The headrest portion 600 may include a headrest 610 that is in contact with the examinee's head part. At least a portion of the headrest 610 may be machined into a concave shape to correspond to a shape of the head.

The armrest may be located on both sides of the seat portion 200 or the backrest portion 300. The armrest may be provided at a position corresponding to a portion in which both arms of the examinee seated on the seat portion 200 are naturally positioned so that the examinee may be examined in a stable posture.

The treatment table portion 800 may be a cradle on which various dental instruments are disposed to use the unit chair 10 for medical treatment and/or care. At least one of electricity, pneumatic pressure, and hydraulic pressure to be used for an operation of a surgical instrument may be supplied to the treatment table portion 800. For example, it means that an oral light, one of the surgical instruments, may be turned on with the supplied electricity.

The treatment table portion 800 may include various switches. Considering a location of an operator, the treatment table portion 800 may be located at a distance for the operator to easily reach with his or her hand. Accordingly, various switches for controlling each portion of the unit chair 10 may be located in the treatment table portion 800.

A lighting unit (not shown) may be at a position in which the inside of the examinee's oral cavity is not covered by the operator's body or the like. For example, when the operator moves his upper body to examine the inside of the examinee's oral cavity, the lighting unit is positioned at an upper position in which the inside of the oral cavity is not darkened.

The lighting unit (not shown) may emit different lights as needed. For example, it means that brightness and/or a wavelength may be adjusted according to ambient brightness and/or the contents of the examination.

In an embodiment, it is possible to control a luminous intensity of illumination of the lighting unit (not shown) by the controller 100 in response to a posture adjustment of the headrest 610 according to an operation of a link unit 900 of the present disclosure.

The water supply unit (not shown) may be used for procedures such as cleaning the inside of the oral cavity of the examinee. The water supply unit (not shown) may include a drainage device and/or a cuspidor for spitting.

The display unit (not shown) may display various types of information required for examination. For example, it means that an X-ray image of the examinee's oral condition and an image of the inside of the examinee's mouth may be displayed in real time. The position/angle of the display unit may be adjusted up, down, left and right as needed so that the examinee feels less fatigue.

The foot control unit (not shown) may be used to control the operation of at least one dental instrument. The examinee may freely use both hands, while controlling the surgical instrument by operating the foot control unit (not shown) with the foot.

The controller 100 may perform a control operation on each portion of the unit chair 10. The controller 100 may cause each portion of the unit chair 10 to be organically operated.

The controller 100 may be distributed in a plurality of locations. For example, the base portion 700 may be controlled by a first controller, and the treatment table portion 800 may be controlled by a second controller. The first and second controllers may transmit signals in one direction or in both directions so that the unit chair 10 as a whole operates harmoniously.

The controller 100 may perform a control operation on the associated device of the unit chair 10. For example, when the controller 100 is located in the base portion 700, the controller 100 may perform a control operation on all or some of the components of the unit chair 10 together with the base portion 700 during the examination. For example, it means that an activation or deactivation control operation is performed on the associated device.

The power supply unit (not shown) may be a device for supplying power to the unit chair 10. The power supply unit (not shown) may include a converter for AC/DC power and/or a voltage/current converter suitable for each component.

As shown in FIG. 2, according to an embodiment of the present disclosure, the headrest portion 600 may include a headrest 610 supporting the examinee's head and a link unit 900 linking the headrest 610 and one end of the backrest portion 300.

The link unit 900 may perform an operation for adjusting a posture of the headrest 610. That is, basically having a function of connecting the headrest 610 to one end of the backrest portion 300 and supporting a load of the examinee's head, the link unit 900 may perform an angle adjustment operation of bending or unfolding in forward and backward directions of the examinee's head or move forward or backward the headrest 610 to adjust a posture for convenience during treatment.

A user (medical staff) may adjust the angle or posture by holding the headrest 610 with one hand and applying an external force.

Hereinafter, a configuration of the link unit 900 of the present disclosure will be described in more detail with reference to the drawings.

Figure 3:
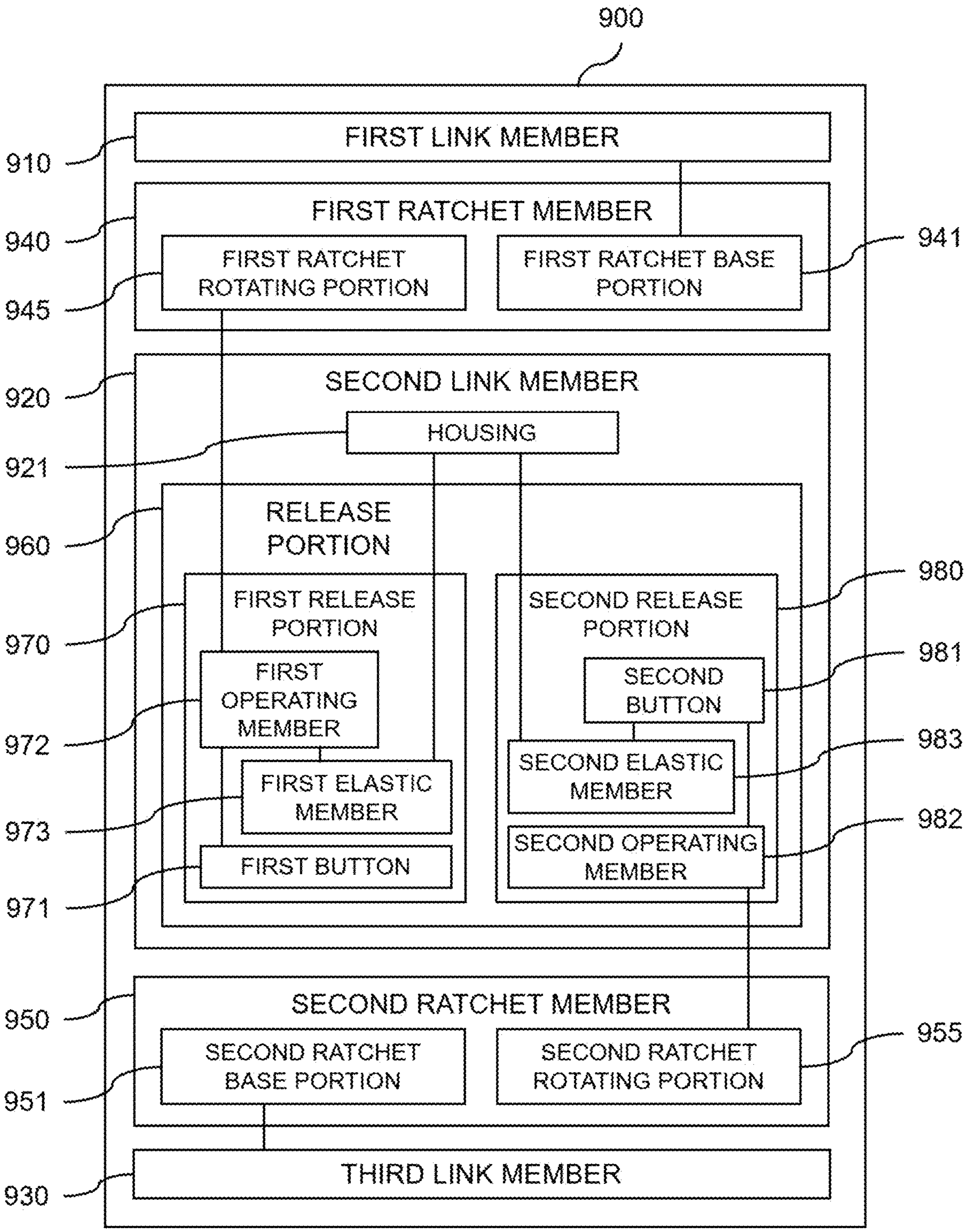
FIG. 3 is a block diagram illustrating a configuration of a link unit according to an embodiment of the present disclosure.
Figure 4:
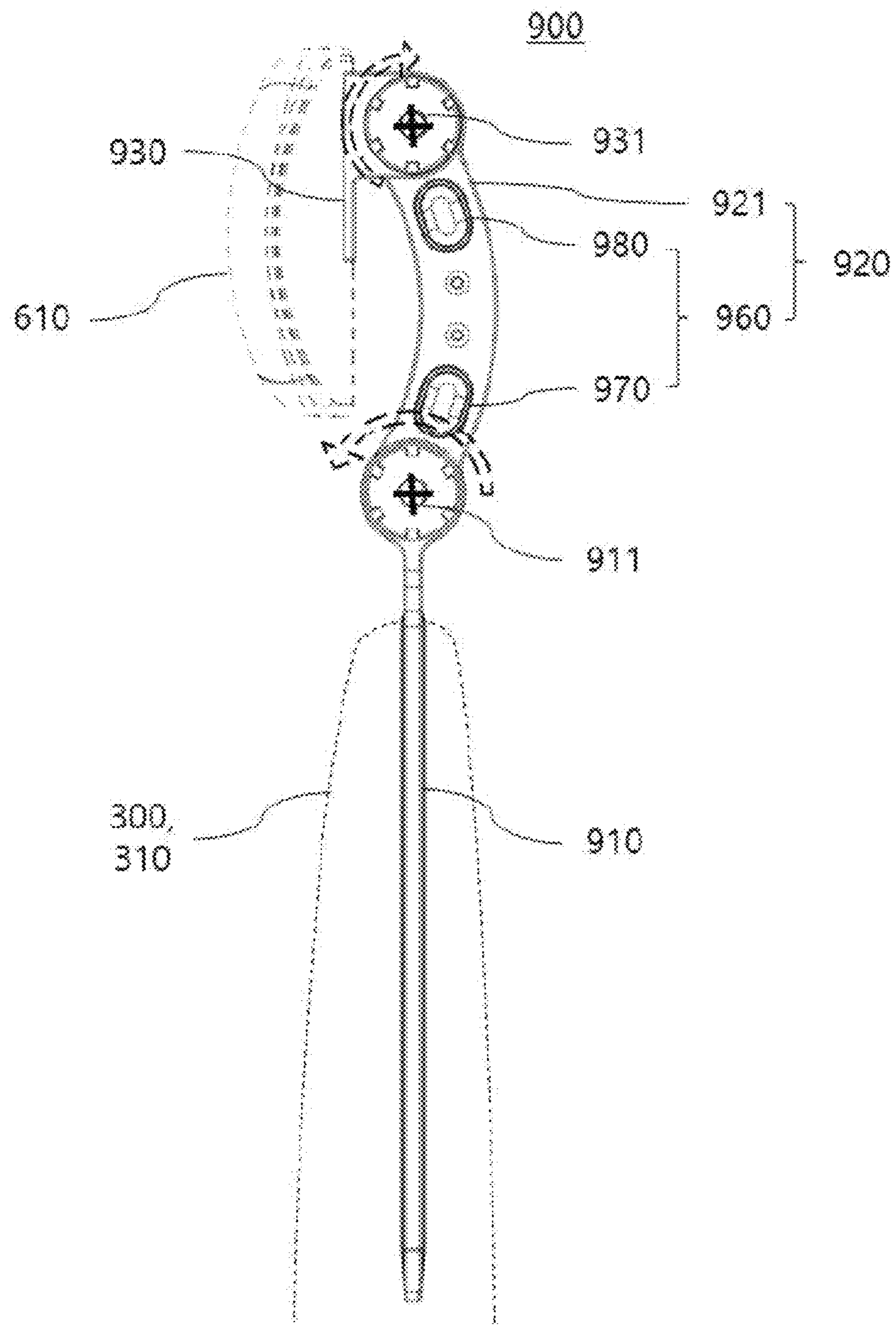
FIG. 4 is a right view of a link unit according to an embodiment of the present disclosure.

FIG. 3 is a block diagram illustrating a configuration of a link unit according to an embodiment of the present disclosure. FIG. 4 is a right view of a link unit according to an embodiment of the present disclosure. As shown in FIGS. 3 and 4, the link unit 900 may include a series of first link member 910 and a second link member 920. Also, according to an embodiment, the link unit 900 may further include a third link member 930.

The first link member 910 may be fixed to the backrest portion 300 of the unit chair 10.

In an embodiment of the present disclosure, the first link member 910 may be coupled to one end of the backrest portion 300 to be semi-permanently fixed.

In another embodiment of the present disclosure, the first link member 910 may be elongated and may be slidably coupled to an insertion hole of one end of the backrest portion 300.

When the unit chair 10 needs to accommodate a tall examinee, the first link member 910 may slide so that the headrest 610 is away from one end of the backrest 300 and is fixed to a specific position.

When the unit chair 10 needs to accommodate a rather short examinee, the first link member 910 may slide so that the headrest 610 approaches the one end of the backrest portion 300 and is fixed to a specific position.

One end portion of the second link member 920 may be hinged to the first link member 910 by a first hinge pin 911.

One end portion of the third link member 930 may be hinged to the other end portion of the second link member 920, not the one end portion thereof, by a second hinge pin 931.

As shown in FIG. 4, the headrest 610 may be fixed to one surface of the third link member.

The link unit 900 may further include a first ratchet member 940 formed on one surface of at least one of the first link member 910 and the second link member 920.

The first ratchet member 940 may include two sub-members rotatable in only one direction relative to each other in contact with each other.

The two sub-members may be a first ratchet base portion 941 and a first ratchet rotating portion 945 of the present disclosure to be described below.

It is possible to further simplify a structure of the headrest portion 610 by using a structure of a ratchet, without using a structure such as a gas spring or a leaf spring.

The first ratchet member 940 may constrain the motion of the second link member 920 to a unidirectional rotational motion.

The first ratchet member 940 may constrain the motion of the second link member 920 so that the second link member 920 may rotate only in one direction (a direction indicated by the dotted arrow at a lower portion in FIG. 4) based on a central axis line (the center having a "+" shape at the lower portion in FIG. 4) of the first hinge pin 911.

The second link member 920 may include a release portion 960 capable of releasing the motion constraint state of the second link member 920 by transmitting an external force to the first ratchet member 940.

The link unit 900 of the present disclosure may further include a second ratchet member 950 formed on one surface of at least one of the second link member 920 and the third link member 930.

The second ratchet member 950 may be structurally formed to be the same as that of the first ratchet member 940.

The second ratchet member 950 may constrain a motion of the third link member 930 to a unidirectional rotational motion.

The second ratchet member 950 may constrain a motion of the third link member 930 so that the third link member 930 may rotate only in one direction (a direction indicated by the dotted arrow at an upper portion in FIG. 4) based on a central axis line (the center having a "+" shape at an upper portion in FIG. 4) of the second hinge pin 931.

In an embodiment further including the second ratchet member 950, the release portion 960 may release the motion constraint state of the third link member 930 by transmitting an external force to the second ratchet member 950.

The first ratchet member 940 may be formed on one surface of at least one of the first link member 910 and the second link member 920.

The second ratchet member 950 may be formed on one surface of at least one of the second link member 920 and the third link member 930.

Figure 5A:
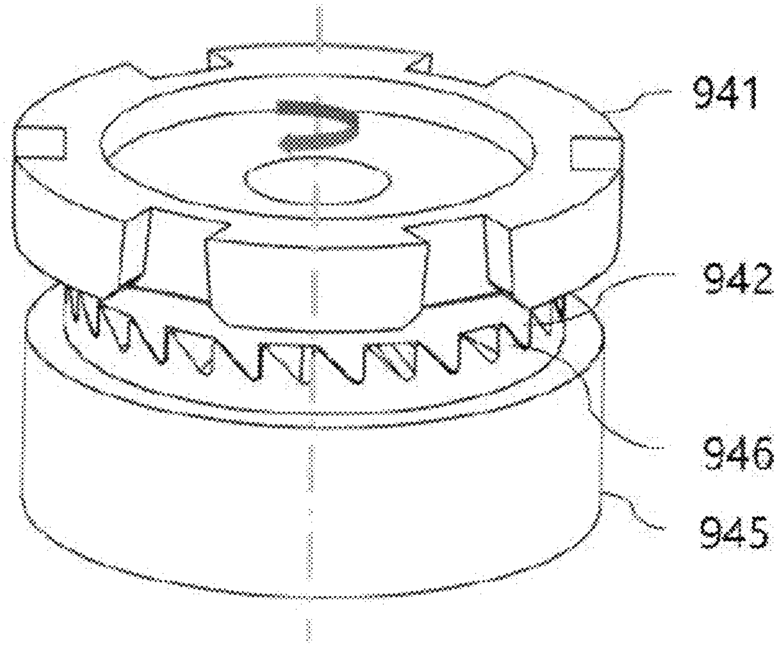
FIGS. 5A and 5B are views illustrating a structure of a first ratchet member according to an embodiment of the present disclosure.
Figure 5B:
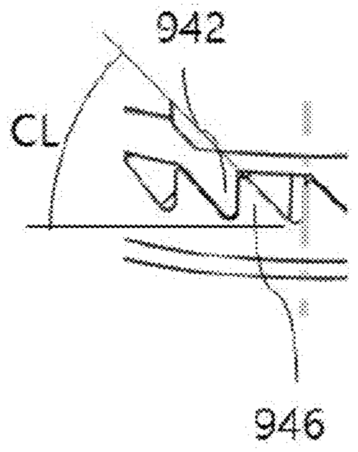

FIGS. 5A and 5B are views illustrating a structure of the first ratchet member according to an embodiment of the present disclosure.

As shown in FIG. 5A and FIG. 5B, which is an enlarged view of a portion thereof, the first ratchet member 940 may constrain the motion of the second link member 920 so that the second link member 920 is rotatable only in one direction based on a central axis line of the first hinge pin 911 as saw teeth having an inclined shape and facing each other are engaged with each other.

The first ratchet member 940 may include two saw teeth groups each including a plurality of saw teeth inclined in only one direction.

The two saw teeth groups may refer to a group of the saw teeth 942 formed in a component 941 illustrated in an upper portion of FIG. 5A and a group of saw teeth 946 formed in a component 945 illustrated in a lower portion of FIG. 5A.

The first ratchet member 940 may constrain the motion of the second link member 920 so that the second link member 920 is rotatable only in one direction based on the central axis line of the first hinge pin 911 through an interconnection of the two saw teeth groups.

The second ratchet member 950 may have a structure equivalent to that of the first ratchet member 940.

The second ratchet member 950 may also constrain the motion of the third link member 930 so that the third link member 930 is rotatable only in one direction based on the central axis line of the second hinge pin 931 as the saw teeth having an inclined shape and facing each other are engaged with each other.

The second ratchet member 950 may include two saw teeth groups each including a plurality of saw teeth inclined in only one direction.

The second ratchet member 950 may constrain the motion of the third link member 930 so that the third link member 930 is rotatable based on the central axis line of the second hinge pin 931 through an interconnection of the two saw teeth groups.

The first release portion 970 may release the interconnection of the two saw teeth groups of the first ratchet member 940 to release the motion constraint state of the second link member 920, when an external force is applied.

When an external force is applied, the second release portion 980 may release the interconnection of the two saw teeth groups of the second ratchet member 950 to release the motion constraint state of the third link member 930.

More specifically, the first ratchet member 940 may include a first ratchet base portion 941 and a first ratchet rotating portion 945. The first ratchet base portion 941 and the first ratchet rotating portion 945 may form a clutch configuration to transmit a force when interconnected. That is, a one-way-clutch system may be implemented.

The second ratchet member 950 may include a second ratchet base portion 951 and a second ratchet rotating portion 955. The second ratchet base portion 951 and the second ratchet rotating portion 955 may form a clutch configuration to transmit a force when interconnected.

A plurality of saw teeth 942 arranged in a ring shape based on the central axis line of the first hinge pin 911, uplifted in a direction toward the central axis line, and inclined in only one direction may be formed on one surface of the first ratchet base portion 941. A surface opposite to the one surface may be fixed to the first link member 910.

A plurality of saw teeth 952 arranged in a ring shape based on the central axis line of the second hinge pin 931, uplifted in a direction toward the central axis line, and inclined in only one direction may be formed on one surface of the second ratchet base portion 951. A surface opposite to the one surface may be fixed to the third link member 930.

A plurality of saw teeth 946, which are at least partially engaged with at least some of the saw teeth 942 of the first ratchet base portion 941, may be formed on one surface of the first ratchet rotating portion 945. A surface opposite to the one surface may be fixed to the second link member 920.

A plurality of saw teeth 956, which are at least partially engaged with at least some of the saw teeth 952 of the second ratchet base portion 951, may be formed on one surface of the second ratchet rotating portion 955. A surface opposite to the one surface may be fixed to the second link member 920.

Through the configuration of the annularly arranged saw teeth to be engaged with each other, a force mutually transmitted by the first ratchet rotating portion 945 and the first ratchet base portion 941 and a force mutually transmitted by the second ratchet rotating portion 955 and the second ratchet base portion 951 may be distributed. Accordingly, it is possible to support the examinee's head with a stronger force and it is possible to ensure durability by extending a lifespan of the ratchet members.

In addition, the first ratchet rotating portion 945 and the first ratchet base portion 941 are formed of a synthetic resin-based material, rather than a metal, and manufactured through injection molding, costs for materials and machining may be reduced.

The saw teeth 946 may also be formed to be inclined only in one direction. Therefore, when a mutual force is transmitted to the inclined surface of each of the saw teeth 942 and 946, sliding is possible, but when a mutual pushing force is transmitted to a perpendicular surface, sliding is impossible, so mutual rotation of the first ratchet base portion 941 and the first ratchet rotating portion 945 is also impossible.

In general, the saw teeth of a gear wheel are formed as inclined planes corresponding to both directions of rotation. However, the saw teeth 942, 946, 952, and 956 of the present disclosure may be formed with an inclined plane in one direction and may be formed at a right angle in the other direction as shown in FIGS. 5A and 5B.

The right angle in the present disclosure may refer to a right angle in a practical sense rather than a geometric meaning.

If the inclined plane is too gentle, the mutual motion constraint state of the ratchet base portions 941 and 951 and the corresponding ratchet rotating portions 945 and 955 may be easily released. In this case, the headrest 610 may be turned to the rear of the examinee, while accommodating and treating the examinee, which may cause discomfort and risk.

If the inclined plane is excessively steep, it may be difficult to rotate the ratchet base portions 941 and 951 and the corresponding ratchet rotating portions 945 and 955 in one direction. In this case, it may be difficult to achieve the purpose of changing the position and posture of the headrest with one hand to a state necessary to perform medical treatment.

The saw teeth 942 and 946 of the first ratchet base portion 941 and the first ratchet rotating portion 945 are preferably at an inclination angle (CL of FIG. 5B) ranging from 40 degrees to 50 degrees only in one direction with respect to a plane on which the saw teeth 942 and 946 are formed.

More preferably, the inclination angle CL is 45 degrees.

The saw teeth 952 and 956 of the second ratchet base portion 951 and the second ratchet rotating portion 955 are preferably at an inclination angle ranging from 40 degrees to 50 degrees only in one direction with respect to a plane on which the saw teeth 952 and 956 are formed.

More preferably, the inclination angle CL is 45 degrees.

Any one of the number of saw teeth 942 of the first ratchet base portion 941 and the number of saw teeth 946 of the first ratchet rotating portion 945 may be a multiple of 2 or greater of the other.

Any one of the number of saw teeth 952 of the second ratchet base portion 951 and the number of saw teeth 956 of the second ratchet rotating portion 955 may be a multiple of two or greater of the other.

In this manner, configuring the number of saw teeth of one of the ratchet base portions 941 and 951 and the corresponding ratchet rotating portions 945 and 955 to be different from the number of the other saw teeth and designing to establish the relationship of multiples and divisors to each other have many advantages.

First, since a portion of saw teeth of a component having a shape difficult for injection molding, among the ratchet base portions 941 and 951 and the corresponding ratchet rotating portions 945 and 955, is omitted, injection molding may be facilitated.

In addition, an angle at which two contiguous saw teeth in components having a large number of saw teeth during one-way rotation is maintained at a minimum angle or rotation, thereby enabling more precise operation, and since a frictional surface is reduced, the ratchet base portions 941 and 951 and the corresponding ratchet rotating portions 945 and 955 may be prevented from becoming stuck to each other.

More preferably, the number of saw teeth 946 of the first ratchet rotating portion 945 may be twice the number of saw teeth 942 of the first ratchet base portion 941. The number of saw teeth 956 of the second ratchet rotating portion 955 may be twice the number of saw teeth 952 of the second ratchet base portion 951 (see FIGS. 5A and 5B).

The plurality of saw teeth 946 of the first ratchet rotating portion 945 and the plurality of saw teeth 956 of the second ratchet rotating portion 955 may each be arranged in a ring shape at equal angular intervals.

Meanwhile, as shown in FIG. 4, the motion of the second link member 920 is constrained by the first ratchet member 940 so that the second link member 920 may rotate only in a direction toward the seat surface 310 of the backrest portion 300.

The seat surface 310 may refer to a surface that the examinee's back touches among the outer surfaces of the backrest portion 300.

As shown in FIG. 4, the motion of the third link member 930 is constrained by the second ratchet member 950 and is rotatable only in a direction opposite to a direction (a rotation direction indicated by the dotted line arrow at a lower portion in FIG. 4) in which the second link member 920 is rotatable.

Figure 6A:
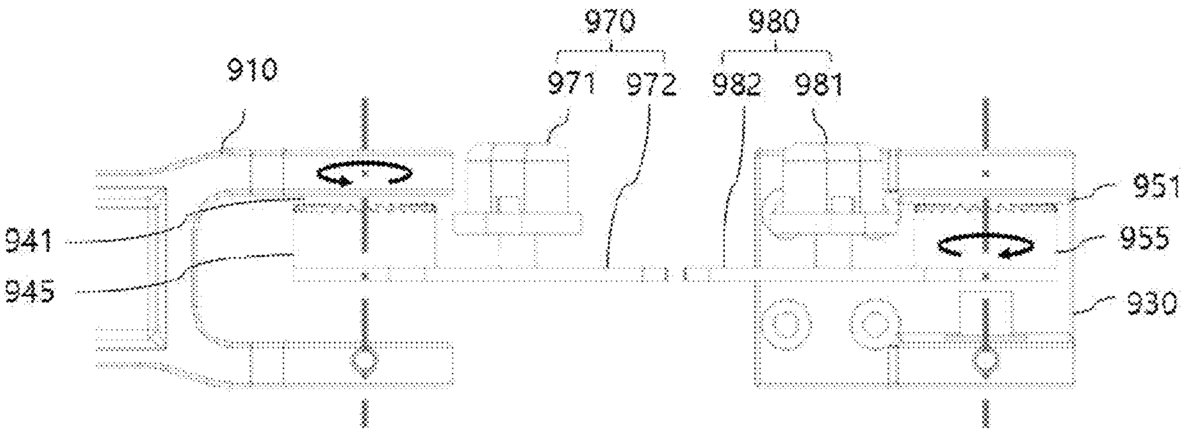
FIGS. 6A and 6B are views illustrating a structure and operation of a release portion of the present disclosure.
Figure 6B:
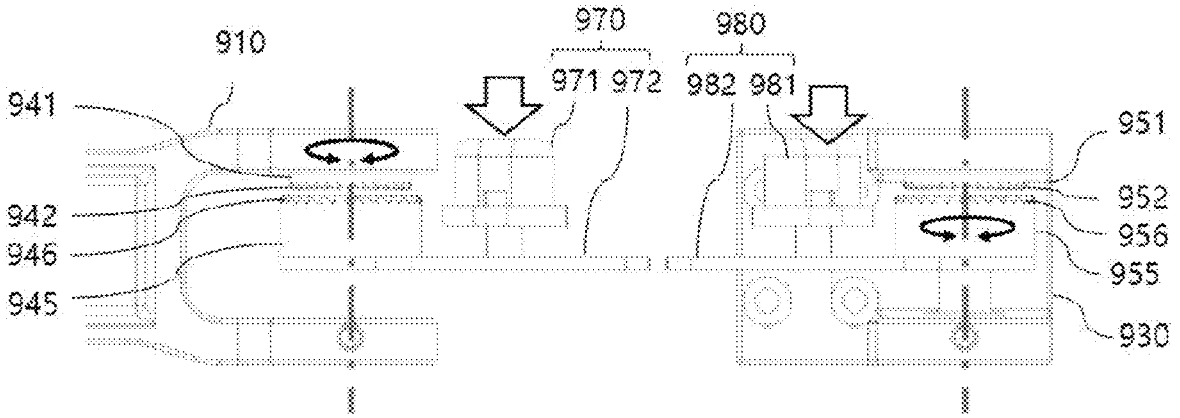

FIGS. 6A and 6B are views illustrating a structure and operation of the release portion of the present disclosure.

As shown in FIG. 6A, the release portion 960 may include a first release portion 970 and a second release portion 980 that operates independently of the first release portion 970.

As shown in FIG. 6B, the first release portion 970 may transmit an external force (acting in the direction of the right arrow in FIG. 6B) to the first ratchet member 940 to release a motion constraint state of the second link member 920.

The second release portion 980 may transmit an external force (acting in the left arrow direction in FIG. 6B) to the second ratchet member 950 to release a motion constraint state of the third link member 930.

Figure 7A:
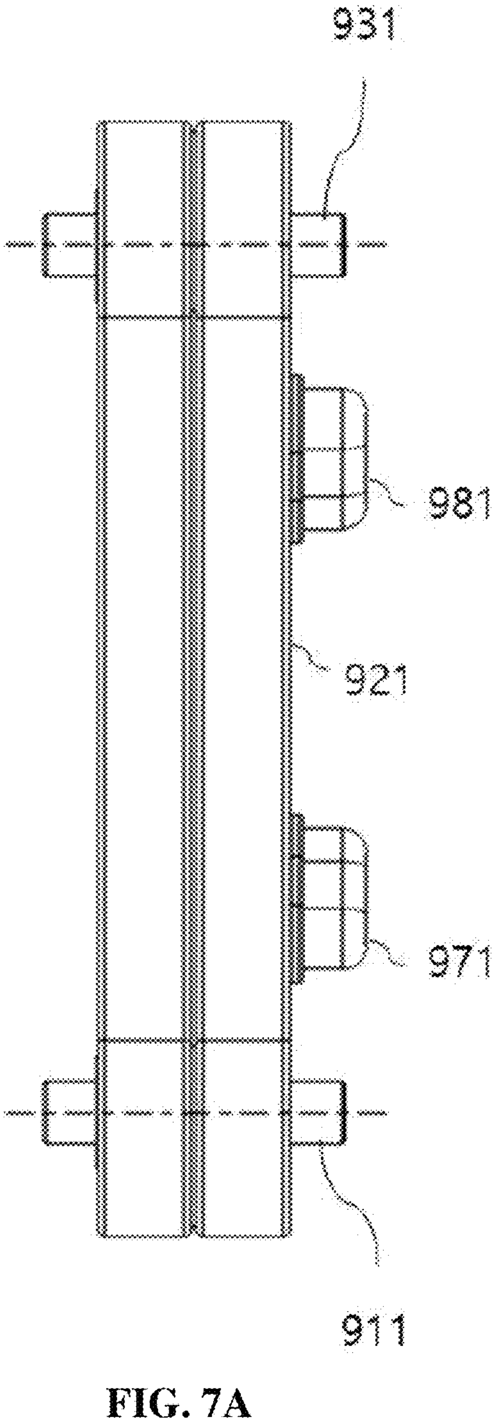
FIGS. 7A and 7B are respectively a front view and a right view illustrating an assembled outer appearance of a second link member of the present disclosure.
Figure 7B:
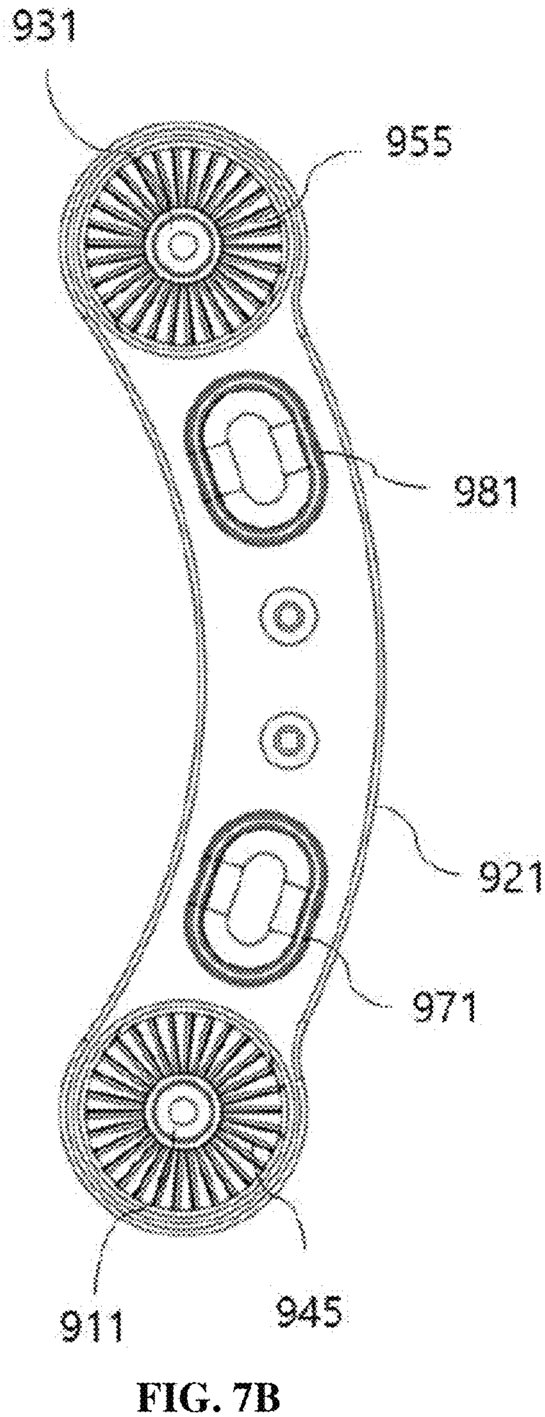

FIGS. 7A and 7B are respectively a front view and a right view illustrating an assembled outer appearance of a second link member of the present disclosure.

As shown in FIGS. 7A and 7B, the first release portion 970 may include a first button 971 and a first operating member 972.

The first button 971 may be configured to protrude from one outer side surface of the second link member 920, to which an external force applied by a user is applied.

The first operating member 972 may be formed inside the second link member 920.

The first operating member 972 may be supported by a first elastic member 973. The first elastic member 973 may be formed of a coil spring, a leaf spring, a torsion spring, or the like.

One end of the first elastic member 973 may be fixed to the first operating member 972, and the other end of the first elastic member 973 may be fixed to a housing 921 forming an outer appearance of the second link member 920.

When the external force applied to the first button 971 is removed, the first elastic member 973 may return the first operating member 972 to its original position.

The first button 971 and the first ratchet rotating portion 945 may be fixed to one surface of the first operating member 972. When an external force is applied to the first button 971, the first operating member 972 may integrally move with the first button 971 and the first ratchet rotating portion 945 to separate the first ratchet rotating portion 945 from the first ratchet base portion 941. When the separation occurs, a motion constraint of the second link member 920 in one direction is released.

The second release portion 980 may be structurally formed to have the same configuration as that of the first release portion 970.

The second release portion 980 may include a second button 981 and a second operating member 982.

The second button 981 may be configured to protrude from one outer side surface of the second link member 920, to which an external force applied by a user is applied.

The second operating member 982 may be formed inside the second link member 920.

The second operating member 982 may be supported by the second elastic member 983. The second elastic member 983 may be formed of a coil spring, a leaf spring, a torsion spring, or the like.

One end of the second elastic member 983 may be fixed to the second operating member 982, and the other end of the second elastic member 983 may be fixed to the housing 921 forming an outer appearance of the second link member 920.

When the external force applied to the second button 981 is removed from the second elastic member 983, the second elastic member 983 may return the second operating member 982 to its original position.

The second button 981 and the second ratchet rotating portion 955 may be fixed to one surface of the second operating member 982. When an external force is applied to the second button 981, the second operating member 982 may integrally move together with the second button 981 and the second ratchet rotating portion 955 to separate the second ratchet rotating portion 955 from the second ratchet base portion 951. When the separation occurs, the motion constraint the third link member 930 in one direction is released.

Figure 8:
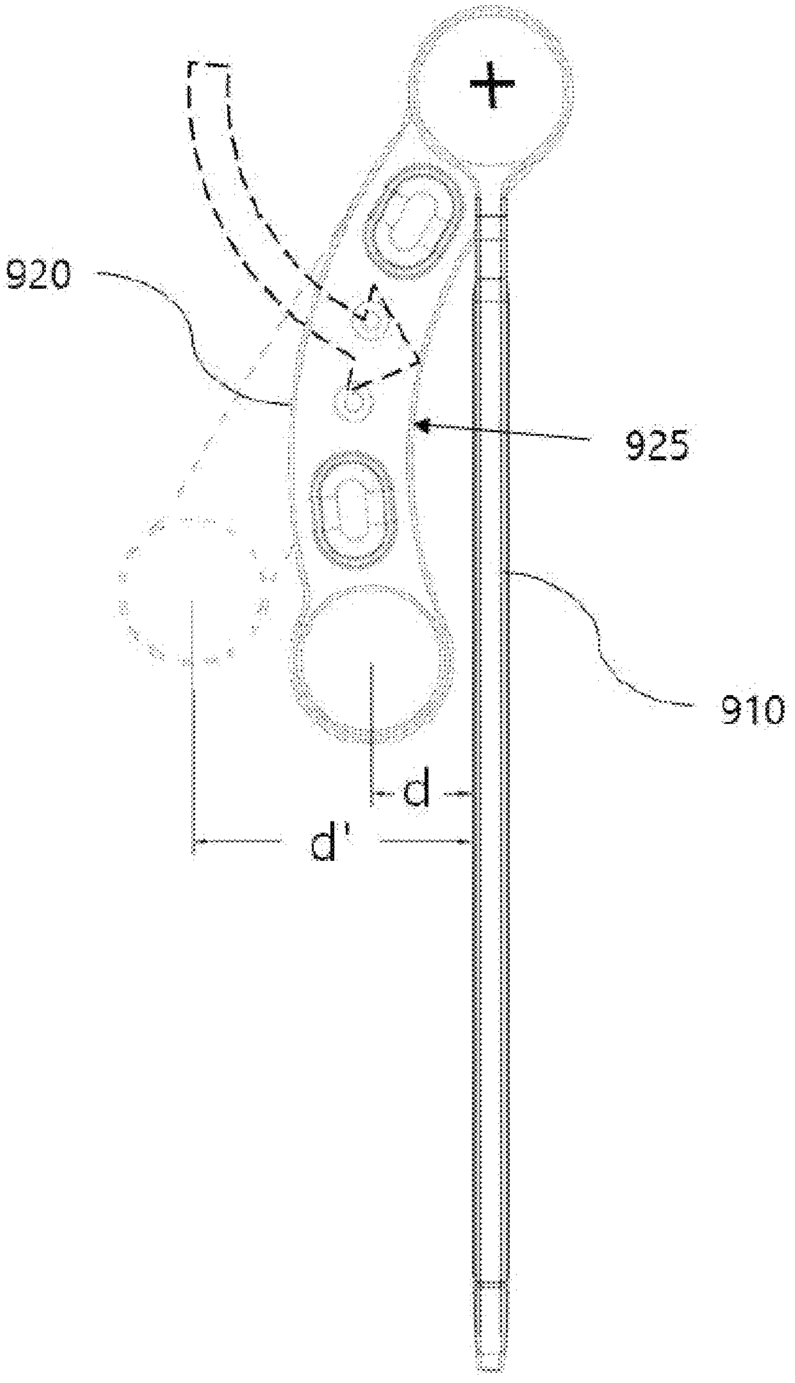
FIG. 8 is a view illustrating a shape of a second link member of the present disclosure.

FIG. 8 is a view illustrating a shape of the second link member of the present disclosure. As shown in FIG. 8, among the external surfaces of the second link member 920, a surface 925, which is a front end when the second link member 920 rotates in the one direction, may have a recessed shape when observed in the central axis line direction of the first hinge pin 911. That is, when viewed from the side of the headrest portion 600, the front end surface 925 may be recessed toward a rear end surface and formed to be concave.

Preferably, the front end surface 925 may be formed in a "C" shape when viewed from the side. More preferably, the front end surface 925 may be formed in an arc shape when viewed from the side surface.

The second link member 920 may have an overall 'C' shape. Preferably, the second link member 920 is preferably formed in an arc shape.

The second link member 920 formed in a curved shape as described above may easily move the headrest 610 to a position suitable for a very short examinee such as a child.

Figure 9:
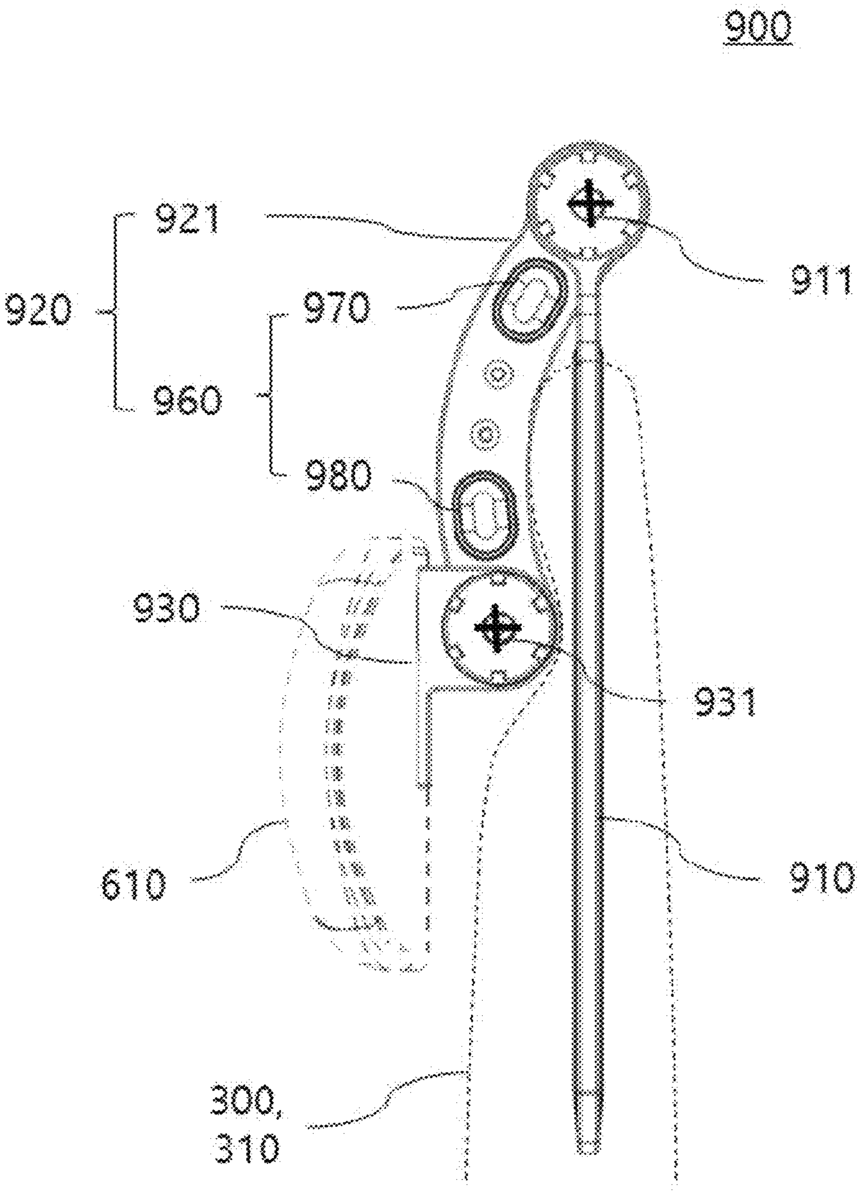
FIG. 9 is a right view of a link unit according to an embodiment of the present disclosure.

FIG. 9 is a right view of a link unit according to an embodiment of the present disclosure. FIG. 9 may mean a state in which the headrest is positioned at a location suitable for a child as described above.

In the embodiment of FIG. 9, each of the first link member 920 and the third link member 930 may be in a fully rotated state.

In FIG. 9, the headrest 610 is in a position adjusted to fit a child's height.

The curved shape of the second link member 920 enables realization of a posture mode that may effectively support a head of a short examinee, such as a child.

As can be seen in FIG. 8, when the second link member 920 is simply implemented in a straight shape, a distance d' between the end portion to which the third link member 930 is connected and the first link member 910 is large.

In this case, when accommodating a very short examinee such as a child, the examinee's head is bent excessively forward, so it is not suitable as a headrest.

However, when the second link member 920 is formed in a curved shape as in the present disclosure, the distance d between the end portion to which the third link member 930 is connected and the first link member 910 may be appropriately maintained according to a body shape of the child body shape of the child.

As shown in FIG. 9, when the first link member 910 is fixed to the backrest portion 300, the other end portion of the second link member 920, i.e., an end portion to which the third link member 930 is coupled, preferably contacts the seat surface 310 of the backrest portion 300 through rotation of the second link member 920 in one direction. More preferably, it is preferable that the other end portion may advance so as to deform the seat surface 310 after contacting the seat surface 310 through rotation of the second link member 920 in the one direction. That is, it is buried in the seat surface 310. Through this, a height (thickness) of the headrest 610 may be further lowered to be suitable for mounting the head of a child.

The seat surface 310 may refer to a surface that the examinee's back touches among the outer surfaces of the backrest portion 300.

If the second link member 920 is simply implemented in a straight shape, the end portion of the second link member 920 to which the third link member 930 is coupled cannot contact the seat surface 310 of the backrest portion 300 structurally.

Meanwhile, as shown in FIG. 4, the motion of the second link member 920 is constrained by the first ratchet member 940 and is rotatable only in a direction toward the seat surface 310 of the backrest portion 300.

The seat surface 310 may refer to a surface that the examinee's back contacts among the outer surfaces of the backrest portion 300.

As shown in FIG. 4, the motion of the third link member 930 is constrained by the second ratchet member 950 and is rotatable only in a direction opposite to a direction (rotation direction indicated by the dotted line arrow at a lower portion in FIG. 4) in which the second link member 920 is rotatable.

With the shape of the recessed front end portion of the second link member 920 as described above, by setting the directions in which each of the second link member 920 and the third link member 930 may rotate freely, a user such as a doctor may easily switch a headrest posture mode for adults (see FIG. 4) to a headrest posture mode for children (see FIGS. 6A and 6B), while holding the headrest 610 only with one hand.

In addition, the headrest posture mode may be easily returned to the headrest posture mode (see FIG. 4) for adults by releasing the motion constraint state of each of the second link member 920 and the third link member 930 by operating the release portion 960.

Figure 10A:
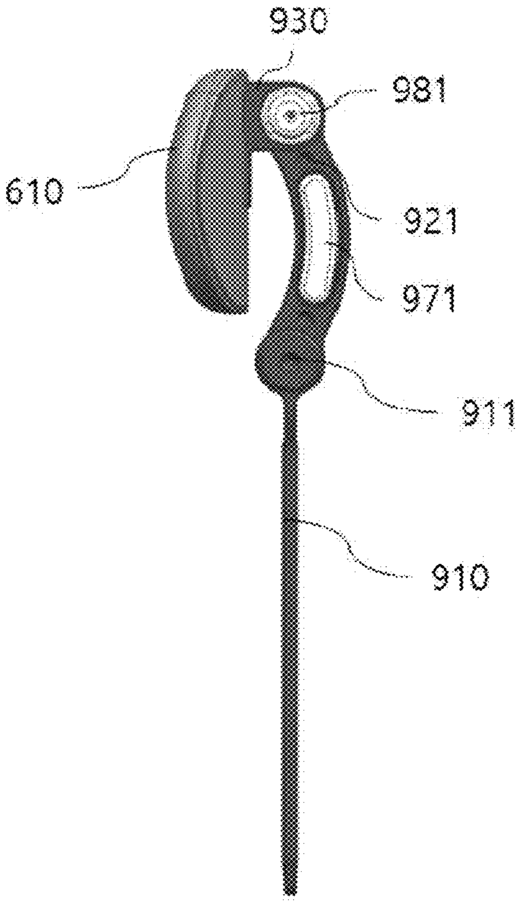
FIGS. 10A and 10B are respectively a right view and a rear view of a link unit according to an embodiment of the present disclosure.
Figure 10B:
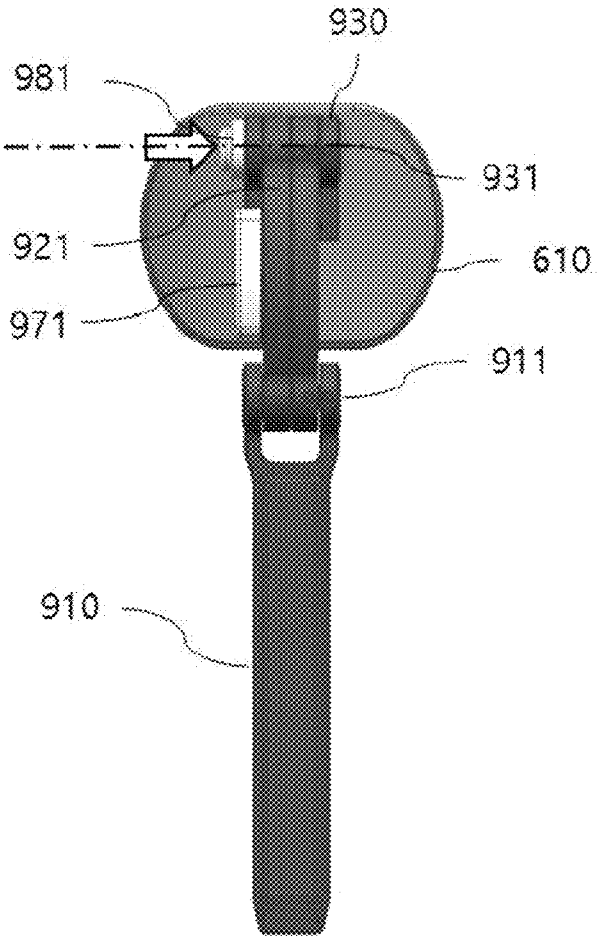

FIGS. 10A and 10B are respectively a right view and a rear view of a link unit according to an embodiment of the present disclosure.

As shown in FIGS. 10A and 10B, at least one of the first release portion 970 and the second release portion 980 according to an embodiment of the present disclosure may include a button 981 moving (see the arrow direction of FIG. 10B) along a trace including a central axis line of the first hinge pin 911 or a central axis line of the second hinge pin 931 when an external force is applied.

According to an embodiment of the present disclosure, the first release portion 970 may include a first button 971 for releasing the motion constraint state of the second link member 920 when an external force is applied. When an external force is applied, the second button may move, while pushing at least a portion of the first ratchet member 940 along a trace including the central axis of the first hinge pin 911. The first button 971 may release the engagement of the saw teeth 942 and 946 of the first ratchet member 940 while moving as described above, thereby releasing the motion constraint state of the second link member 920.

More specifically, the first button 971 may be integrally formed with the first ratchet rotating portion 945. When an external force is applied to the first button 971, the first button 971 and the first ratchet rotating portion 945 may move integrally, and the first ratchet rotating portion 945 may be separated from the first ratchet base portion 941. When the separation occurs, the motion constraint of the second link member 920 in one direction is released.

According to an embodiment of the present disclosure, the second release portion 980 may include a second button 981 for releasing the motion constraint state of the third link member 930 when an external force is applied. When an external force is applied, the second button may move, while pushing at least a portion of the second ratchet member 950 along a trace including the central axis line of the first hinge pin 911. The second button 981, while moving as described, may release the engagement of the saw teeth 952 and 956 of the second ratchet member 950, thereby releasing the motion constraint state of the third link member 930.

More specifically, the second button 981 may be integrally formed with the second ratchet rotating portion 955. When an external force is applied to the second button 981, the second button 981 and the second ratchet rotating portion 955 may move integrally, and the second ratchet rotating portion 955 may be separated from the second ratchet base portion 951. When this separation occurs, the motion constraint of the third link member 930 in one direction is released.

According to an embodiment of the present disclosure, the first release portion 970 may include a first button 971 and a first operating member 972. The first button 971 is formed to protrude from one outer side surface of the second link member 920, and when an external force is applied, the first button 971 may move along a trace parallel to the central axis line of the first hinge pin 911, without including the central axis line of the first hinge pin 911. The first operating member 972 may be formed inside the second link member 920 and supported by the first elastic member 973. When an external force is applied, the first operating member 972 may move integrally with the first button 971 and releases the engagement of the saw teeth 942 and 946 of the first ratchet member 940, thereby releasing the motion constraint state of the link member 920.

According to an embodiment of the present disclosure, the second release portion 980 may include a second button 981 and a second operating member 982. The second button 981 is formed to protrude from one outer side surface of the second link member 920, so that when an external force is applied, the second button 981 may move along a trace parallel to the central axis line of the second hinge pin 931, without including the central axis line of the second hinge pin 931. The second operating member 982 may be formed inside the second link member 920 and supported by the second elastic member 983. When an external force is applied, the second operating member 982 may move integrally with the second button 981 and releases the engagement of the saw teeth 952 and 956 of the second ratchet member 950 to release the motion constraint state of the link member 930.

Figure 11A:
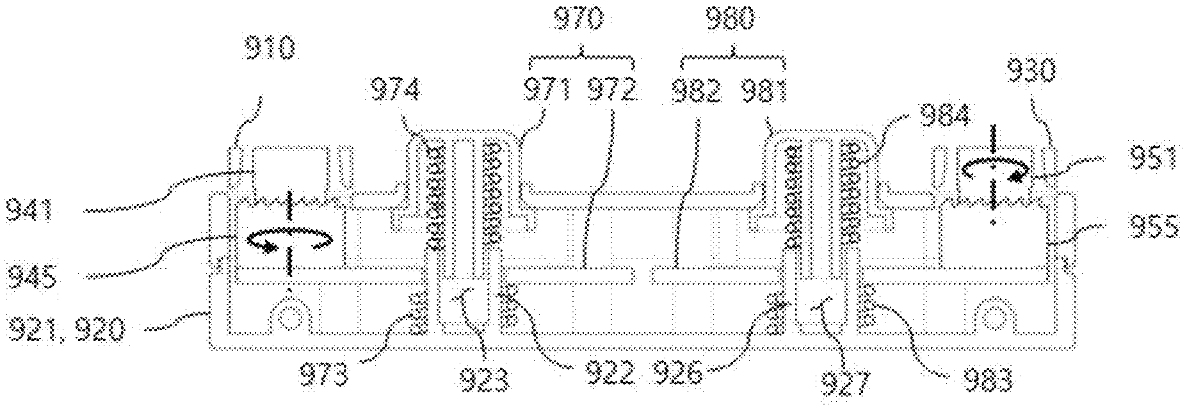
FIGS. 11A to 11C are views illustrating a structure and operation of a release portion of the present disclosure.
Figure 11B:
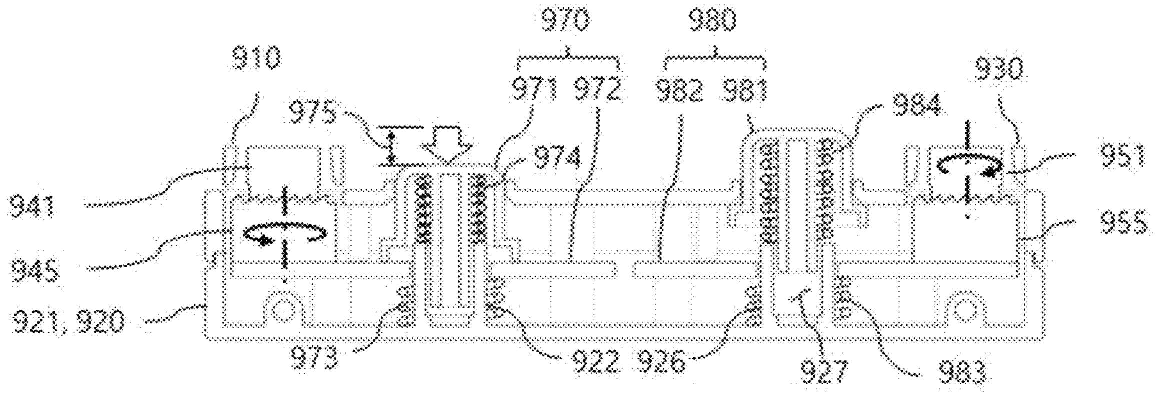
Figure 11C:
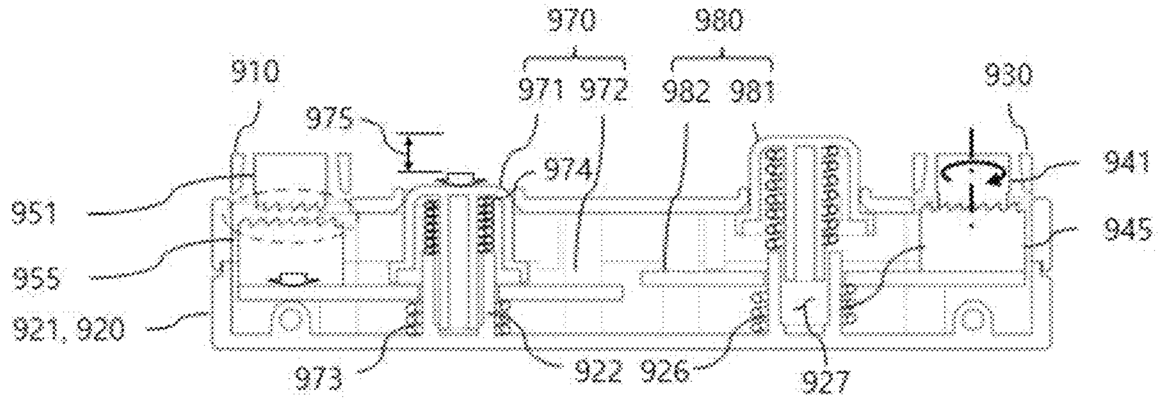

FIGS. 11A to 11C are views illustrating a structure and operation of a release portion of the present disclosure.

As shown in FIG. 11A, the release portion 960 may include a first release portion 970. In addition, according to an embodiment, the release portion 960 may further include a second release portion 980 that operates independently of the first release portion 970.

As shown in of FIG. 11B, the first release portion 970 may transmit an external force (acting in the arrow direction illustrated on upper left portion of FIG. 11B) to the first ratchet member 940 to release a motion constraint state of the second link member 920.

The second release portion 980 may transmit an external force to the second ratchet member 950 to release the motion constraint state of the third link member 930.

The first ratchet member 940 may include a first ratchet base portion 941 and a first ratchet rotating portion 945.

The first ratchet base portion 941 may have a plurality of saw teeth 942 formed on one surface thereof, arranged in a ring shape based on the central axis line of the first hinge pin 911, uplifted in the central axis direction, and having a shape inclined only in one direction. An opposite surface of the one surface may be fixed to the first link member 910.

In general, the saw teeth of a gear wheel are formed as inclined planes corresponding to both directions of rotation. However, as indicated in the oval dotted line of FIG. 11C, the saw tooth 942 of the present disclosure may have an inclined plane in one direction and a right angle in the other direction.

The right angle in the present disclosure may refer to a right angle in a practical sense rather than a geometric meaning.

The first ratchet rotating portion 945 may have saw teeth 946 engaged with the saw teeth 942 of the first ratchet base portion 941 on one surface thereof. An opposite surface of the one surface may be fixed to the second link member 920.

Through the configuration of the annularly arranged saw teeth to be engaged with each other, a force transmitted by the first ratchet rotating portion 945 and the first ratchet base portion 941 may be distributed by the number of saw teeth. Accordingly, it is possible to support the examinee's head with a stronger force, and it is possible to increase a lifespan of the first ratchet rotating portion 945 and the first ratchet base portion 941 to ensure durability.

In addition, the first ratchet rotating portion 945 and the first ratchet base portion 941 are formed of a synthetic resin-based material, rather than a metal, and manufactured through injection molding, costs for materials and machining may be reduced.

The saw teeth 946 may also be formed to be inclined only in one direction. Therefore, when a mutual force is transmitted to the inclined surface of each of the saw teeth 942 and 946, sliding is possible, but when a mutual pushing force is transmitted to a perpendicular surface, sliding is impossible, so mutual rotation of the first ratchet base portion 941 and the first ratchet rotating portion 945 is also impossible.

The second ratchet member 950 may be structurally formed to be the same as that of the first ratchet member 960.

The second ratchet member 950 may include a second ratchet base portion 951 and a second ratchet rotating portion 955.

The second ratchet base portion 951 may have a plurality of saw teeth 952 arranged in a ring shape based on the central axis line (the center of a '+' shape at an upper portion in FIG. 4) of the second hinge pin 931, uplifted in the central axis line direction, and having a shape inclined only in one direction. An opposite surface of the one surface may be fixed to the third link member 930.

The second ratchet rotating portion 955 may have saw teeth 953 on one surface thereof and engaged with the saw teeth 952 of the second ratchet base portion 951, and an opposite surface of the one surface of the second ratchet rotating portion 955 may be fixed to the second link member 920.

The first release portion 970 may include a first deformable member whose shape or position is changed as an external force is applied. The applied external force may be transmitted to the first ratchet member 940 only when the amount of change in the shape or position of the first deformable member exceeds a predetermined first reference amount.

The first reference amount may be a determined numerical reference of the amount by which the first deformable member changes. In an embodiment, when the position of the first deformable member changes, it may mean a displacement value (distance) of a specific reference. In another embodiment, when the shape of the first deformable member changes, it may be a reference volume corresponding to the amount of change in shape.

The first reference amount may be appropriately designed in a range smaller than a maximum value of the amount by which the first deformable member changes. For example, the first reference amount may be set to a value less than half of the maximum value. Preferably, the first reference amount may be designated as a value corresponding to 70% to 80%, and more preferably, 75%.

In this manner, when the first reference amount is set to a value less than half of the maximum value, the malfunction prevention effect of the first release portion 970 is increased.

The first release portion 970 may include a first button 971 and a first operating member 972.

The first button 971 may be configured to protrude from one outer side surface of the second link member 920 and to which an external force applied by a user may be applied.

The first operating member 972 may be formed inside the second link member 920.

The first operating member 972 may be supported by the (1-1)-th elastic member 973. The first elastic member 973 may be formed of a coil spring, a leaf spring, a torsion spring, or the like.

One end of the (1-1)-th elastic member 973 may be fixed to the first operating member 972, and the other end of the first elastic member 973 may be fixed to the housing 921.

When an external force applied to the first button 971 is removed, the (1-1)-th elastic member 973 may return the first operating member 972 to its original position.

The first release portion 970 may further include a first operating member 972 formed inside the second link member 920 and supported by the (1-1)-th elastic member 973, and the first deformable member may include a first button 971 protruding from one outer side surface of the second link member 920 and supported by a (1-2)-th elastic member 974 (see FIGS. 11A to 11C).

When an external force is applied to the first button 971, the first operating member 972 may transmit the applied external force to the first ratchet member 940 only when the first button 971 moves more than a first reference displacement 975 (see FIG. 11C).

When the first button 971 moves more than the first reference displacement 975 as an external force is applied, the first operating member 972 may contact and interwork with the first button 971.

In this manner, when the amount of motion of the first button 971 is less than the first reference displacement 975, an external force is not transmitted to the first ratchet member 940 and the motion constraint state of the second link member 920 continues.

Accordingly, a malfunction of releasing the motion constraint state when the user's hand such as a doctor's hand erroneously touches the button and a certain amount of external force is applied may be prevented.

In addition, a first uplift portion 922 penetrating through a hole formed in the first operating member 972 may be formed inside the housing 921 of the second link member 920, and an outer wall of the first uplift portion 922 may guide a movement direction of the first operating member 972.

In addition, a first guide groove 923 for guiding a motion direction of the first button 971 may be formed in the first uplift portion 922.

By configuring the first uplift portion 922 in this way, the first uplift portion 922 may guide both the motion operations of the first operating member 972 and the first button 971 along an accurate trace.

Also, one end of the (1-2)-th elastic member 974 may be connected to the first uplift portion 922, the other end thereof may be connected to the first button 971 to support the first button 971, and the (1-2)-th elastic member 974 may be deformed according to a motion operation of the first button 971.

When the external force is removed, the (1-2)-th elastic member 974 is out of a deformed state and serves to return the first button 971 to its original position.

When an external force is applied to the first button 971, the first operating member 972 may move together with the first button 971 and the first ratchet rotating portion 945 to separate the first ratchet rotating portion 945 from the first ratchet base portion 941.

When this separation occurs, the motion constraint of the second link member 920 in one direction is released.

The second link member 920 may further include a second release portion 980 operating independently of the first release portion 970 and transmitting an external force to the second ratchet member 950 to release the motion constraint state of the third link member 930.

The second release portion 980 may have the same structure as the first release portion 970 according to an embodiment of the present disclosure.

The second release portion 980 may include a second deformable member whose shape or position is changed as an external force is applied.

The second release portion 980 may be configured to transmit the applied external force to the second ratchet member 950 only when the amount of change in the shape or position of the second deformable member exceeds a predetermined second reference amount.

The second reference amount may have the same properties as the first reference amount and may be set to have the same value.

The second release portion 980 may further include a second operating member 982 formed inside the second link member 920 and supported by a (2-1)-th elastic member 983.

The second operating member 982 may be formed inside the second link member 920.

The second operating member 982 may be supported by the (2-1)-th elastic member 983. The (2-1)-th elastic member 983 may be formed of a coil spring, a leaf spring, a torsion spring, or the like.

One end of the (2-1)-th elastic member 983 may be fixed to the second operating member 982, and the other end of the (2-1)-th elastic member 983 may be fixed to the housing 921 forming an outer appearance of the second link member 920.

When the external force applied to the second button 981 is removed, the (2-1)-th elastic member 983 may return the second operating member 982 to its original position.

The second deformable member may include a second button 981 protruding from one outer side surface of the second link member 920 and supported by a (2-2)-th second elastic member 984.

The second button 981 may be a component to which an external force applied by a user is applied.

The second operating member 982 may transmit the applied external force to the second ratchet member 950 only when the second button 981 moves more than a second reference displacement as an external force is applied t the second button 981.

The second reference displacement may be set to a value equal to the first reference displacement.

In addition, when the second button 981 moves by more than the second reference displacement 975 as an external force is applied, the second operating member 982 may contact and interwork with the second button 981.

As such, when the amount of motion of the second button 981 is less than the second reference displacement, no external force is transmitted to the second ratchet member 950, and the motion constraint state of the third link member 930 continues.

Accordingly, a malfunction of releasing the motion constraint state as the user's hand such as a doctor's hand erroneously touches the button and a certain amount of external force is applied may be prevented.

In addition, a second uplift portion 926 penetrating through a hole formed in the second operating member 982 may be formed inside the housing 921 of the second link member 920, and an outer wall of the second uplift portion 926 may guide a moving direction of the second operating member 982.

In addition, a second guide groove 927 for guiding a motion direction of the second button 981 may be formed in the second uplift portion 926.

By configuring the second uplift portion 926 in this manner, the second uplift portion 926 may guide both the motion operations of the second operating member 982 and the second button 981 along an accurate trace.

Also, one end of the (2-2)-th elastic member 984 may be connected to the second uplift portion 926 and the other end thereof may be connected to the second button 981 to support the second button 981, and the (2-2)-th elastic member 984 may be deformed according to a motion operation of the second button 981.

When the external force is removed, the (2-2)-th elastic member 984 is out of a deformed state and serves to return the second button 981 to its original position.

When an external force is applied to the second button 981, the second operating member 982 may move together with the second button 981 and the second ratchet rotating portion 955 to separate the second ratchet rotating portion 955 from the second ratchet base portion 951.

When this separation occurs, the motion constraint of the third link member 930 in one direction is released.

The (1-1)-th elastic member 973 may be formed of a coil spring that surrounds the outer wall of the first uplift portion 922 (see FIGS. 11A to 11C).

The (1-2)-th elastic member 974 may be inserted into the first button 971. Also, the (1-2)-th elastic member 974 may also be formed of a coil spring (see FIGS. 11A to 11C).

The (2-1)-th elastic member 983 may be formed of a coil spring surrounding the outer wall of the second uplift portion 922 (see FIGS. 11A to 11C).

The (2-2)-th elastic member 984 may be inserted into the first button 981. The (2-2)-th elastic member 984 may also be formed of a coil spring (see FIGS. 11A to 11C).

Figure 12A:
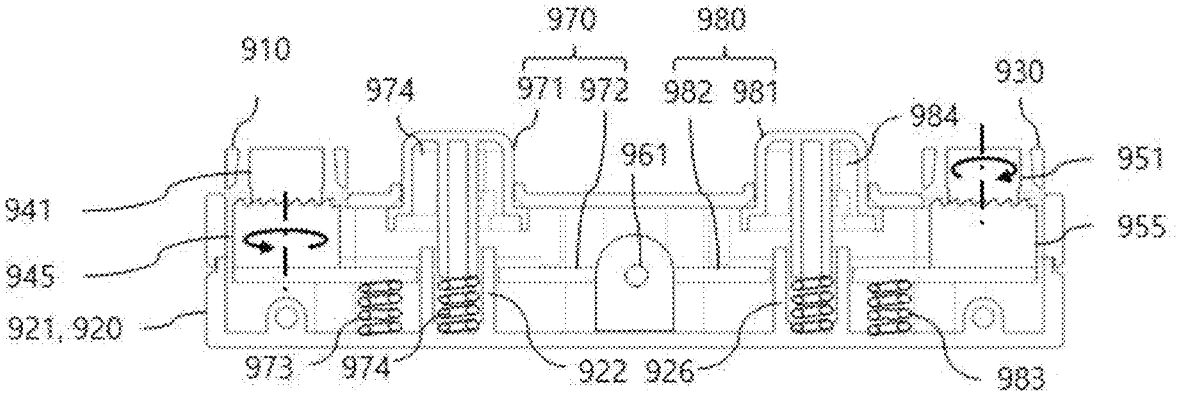
FIGS. 12A and 12B are views illustrating a structure of a release portion according to an embodiment of the present disclosure.
Figure 12B:
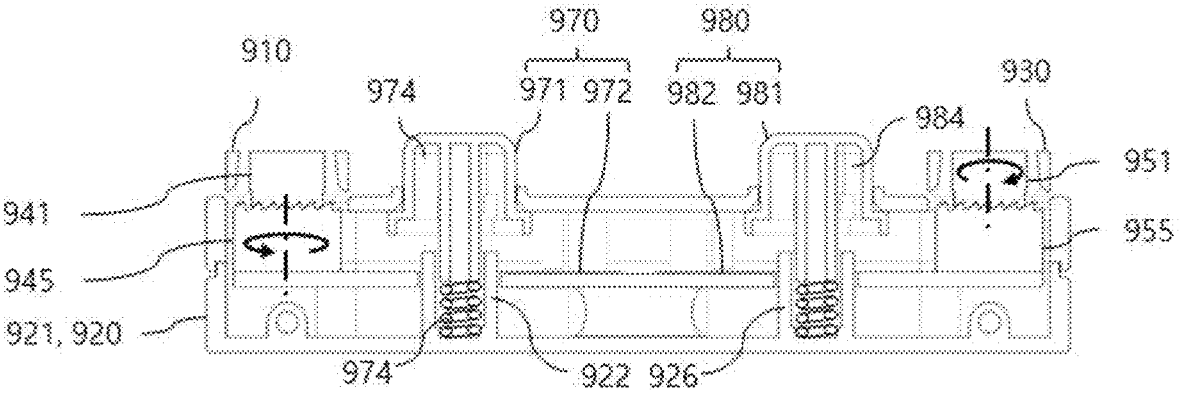

FIGS. 12A and 12B are views illustrating a structure of a release portion according to an embodiment of the present disclosure.

As shown in FIG. 12A, the (1-1)-th, (1-2)-th, (2-1)-th, and (2-2)-th elastic members may be formed at positions different from those of the embodiment shown in FIGS. 11A to 11C.

That is, the (1-1)-th and (2-1)-th elastic members may be formed at positions that do not surround the respective uplift portions 922 and 926 corresponding thereto.

The (1-2)-th elastic member 974 may be inserted into the first guide groove 923 of the first uplift portion 922. The (1-2)-th elastic member 974 may also be formed as a coil spring.

The (2-2)-th elastic member 984 may be inserted into the second guide groove 927 formed in the second uplift portion 926. The (2-2)-th elastic member 984 may also be formed as a coil spring.

In addition, at least one of the first operating member 972 and the second operating member 982 may be hinged to the housing 921. FIG. 12A shows an embodiment in which the first operating member 972 and the second operating member 982 share a third hinge pin 961.

As described above, in the embodiment in which at least one of the first operating member 972 and the second operating member 982 is hinged with the housing 921, the first uplift portion 922 or the second uplift portion 926 preferably have a shape corresponding to a motion trace of the first operating member 972 and the second operating member 982.

In another embodiment, as shown in FIG. 12B, one end of each of the first operating member 972 and the second operating member 982 may be integrally fixed to the housing 921.

In this embodiment, the first operating member 972 and the second operating member 982 may be integrally formed to form a single operating member.

In addition, the first operating member 972 and the second operating member 982 may be formed of a material having an elastic force (e.g., carbon steel, plastic, etc.) and may be configured, without the (1-1)-th elastic member 973 and the (2-1)-th elastic member 983, to perform a function. In this embodiment, the structure may be simplified and the cost may be reduced.

Meanwhile, in the specification and the claims, terms such as "first", "second", "third", "fourth", and the like, if any, will be used to distinguish similar components from each other and be used to describe a specific sequence or a generation sequence, but is not necessarily limited thereto. It may be understood that these terms are compatible with each other under an appropriate environment so that embodiments of the present disclosure to be described below may be operated in a sequence different from a sequence shown or described herein. Likewise, in the present specification, in the case in which it is described that a method includes a series of steps, a sequence of these steps suggested herein is not necessarily a sequence in which these steps may be executed. That is, any described step may be omitted and/or any other step that is not described herein may be added to the method.

In addition, in the specification and the claims, terms such as "left", "right", "front", "rear", "top", "bottom", "over", "under", and the like do not necessarily indicate relative positions that are not changed, but are used for explanation.

It will be understood that these terms are compatible with each other under an appropriate environment so that embodiments of the present disclosure set forth herein may be operated in a direction different from a direction illustrated or described herein. The term "connected" as used herein is defined as being connected directly or indirectly in an electrical or non-electrical manner. Here, targets described as being "adjacent to" each other may physically contact each other, be close to each other, or be in the same general range or region, in a context in which the above phrase is used. Here, the presence of phrase "in an embodiment" means the same embodiment, but is not necessarily limited thereto.

In addition, in the specification and the claims, terms such as "connected", "connecting", "linked", "linking", "coupled", "coupling", and the like, and various modifications of these terms may be used as the meaning including that one component is directly connected to another component or is indirectly connected to another component through the other component.

In addition, terms "module" and "unit" for components used in the present specification are used only in order to easily make the specification. Therefore, these terms do not have meanings or roles that are distinguished from each other.

Terms used in the present disclosure are for explaining embodiments rather than limiting the present disclosure. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Although the embodiments of the present disclosure have been illustrated and described hereinabove, the present disclosure is not limited to the specific embodiments described above, but may be variously modified by those skilled in the art to which the present disclosure pertains without departing from the scope and spirit of the present disclosure as claimed in the claims. These modifications should also be understood to fall within the technical spirit and scope of the present disclosure.

The invention claimed is:

1. A unit chair comprising a link unit for adjusting a posture of a headrest, wherein the link unit includes:

a first link member fixed to a backrest portion of the unit chair;

a second link member having one end portion hinged to the first link member by a first hinge pin; and a first ratchet member formed on one surface of at least one of the first link member and the second link member and constraining motion of the second link member so that the second link member is rotatable only in one direction about a central axis line of the first hinge pin, wherein the first ratchet member includes a first ratchet base portion including a plurality of saw teeth formed on one surface, the plurality of saw teeth arranged in a ring shape centered on the central axis line of the first hinge pin, protruding in a direction parallel to the central axis line, and inclined only in one rotational direction, and the ratchet base portion having an opposite surface fixed to the first link member; and a first ratchet rotating portion including a plurality of saw teeth formed on one surface and at least partially engaged with at least some of the saw teeth of the first ratchet base portion and having an opposite surface fixed to the second link member, wherein the second link member includes a first release portion transmitting an external force to the first ratchet member to release the motion constraint state of the second link member, and wherein the first release portion includes:

a first button protruding from an external side surface of the second link member and receiving an external force applied thereto; and a first operating member formed inside the second link member and supported by a first elastic member, having one surface to which the first button and the first ratchet rotating portion are fixed, and integrally moving together with the first button and the first ratchet rotating portion to separate the first ratchet rotating portion from the first ratchet base portion when an external force is applied to the first button.

2. The unit chair of claim 1, further comprising:

a third link member having one end portion hinged to the other end portion of the second link member by a second hinge pin and allowing the headrest to be fixed to one surface thereof; and a second ratchet member formed on one surface of at least one of the second link member and the third link member and constraining motion of the third link member so that the third link member is rotatable only in one direction about a central axis line of the second hinge pin.

3. The unit chair of claim 2, wherein the second link member includes:

a first release portion transmitting an external force to the first ratchet member to release the motion constraint state of the second link member; and a second release portion operating independently from the first release portion and transmitting an external force to the second ratchet member to release a motion constraint state of the third link member.

4. The unit chair of claim 1, wherein the second link member includes a first release portion transmitting an external force to the first ratchet member to release the motion constraint state of the second link member, wherein the first ratchet member constrains motion of the second link member so that the second link member is rotatable only in one direction about the central axis line of the first hinge pin as the saw teeth of the first ratchet base portion are engaged with the saw teeth of the first ratchet rotating portion, and the first release portion releases the motion constraint state of the second link member by releasing the engagement of the first ratchet member when an external force is applied.

5. The unit chair of claim 3, wherein the second ratchet member includes:

a second ratchet base portion including a plurality of saw teeth formed on one surface, arranged in a ring shape centered on a central axis line of the second hinge pin, protruding in a direction of the central axis line, and inclined only in one direction, and having an opposite surface fixed to the third link member; and a second ratchet rotating portion including a plurality of saw teeth formed on one surface and at least partially engaged with at least some of the saw teeth of the second ratchet base portion and having an opposite surface fixed to the second link member.

6. The unit chair of claim 1, wherein each saw tooth of each of the first ratchet base portion and the first ratchet rotating portion is at an inclination angle of 40 degrees to 50 degrees only in one direction with respect to a surface on which each saw tooth is formed.

7. The unit chair of claim 6, wherein the inclination angle is 45 degrees.

8. The unit chair of claim 6, wherein any one of the number of saw teeth of the first ratchet base portion and the number of saw teeth of the first ratchet rotating portion is a multiple of 2 or greater of the other.

9. The unit chair of claim 8, wherein the number of saw teeth of the first ratchet rotating portion is twice the number of saw teeth of the first ratchet base portion.

10. The unit chair of claim 9, wherein the saw teeth of the first ratchet rotating portion are arranged in a ring shape at equiangular intervals.

11. The unit chair of claim 2, wherein the second link member is constrained in motion by the first ratchet member and is rotatable only in a direction toward a seat surface of the backrest portion, and the third link member is constrained in motion by the second ratchet member so that the third link member is rotatable only in a direction opposite to a direction in which the second link member is rotatable.

12. The unit chair of claim 5, wherein the second release portion includes:

a second button protruding from an external side surface of the second link member and receiving an external force applied thereto; and a second operating member formed inside the second link member and supported by a second elastic member, having one surface to which the second button and the second ratchet rotating portion are fixed, and integrally moving together with the second button and the second ratchet rotating portion to separate the second ratchet rotating portion from the second ratchet base portion when an external force is applied to the second button.

13. The unit chair of claim 1, wherein a surface becoming a front end when the second link member rotates in one direction, in an external surface of the second link member is recessed when observed in a direction of a central axial line of the first hinge pin.

14. The unit chair of claim 13, wherein, when the first link member is fixed to the backrest portion, the other end portion of the second link member, rather than the one end portion of the second link member, contacts a seat surface of the backrest portion.

15. A unit chair comprising a link unit for adjusting a posture of a headrest, wherein the link unit includes:

a first link member fixed to a backrest portion of the unit chair;

a second link member having one end portion hinged to the first link member by a first hinge pin;

a third link member having one end portion hinged to another end portion of the second link member and allowing the headrest to be fixed to one surface of the third link member;

a first ratchet member formed on one surface of at least one of the first link member and the second link member, constraining motion of the second link member so that the second link member is rotatable only in one direction about a central axis line of the first hinge pin according to engagement of saw teeth having an inclined shape and facing each other in a direction parallel to the central axis line; and a second ratchet member formed on one surface of at least one of the second link member and the third link member and constraining motion of the third link member so that the third link member is rotatable only in one direction about a central axis line of the second hinge pin according to engagement of the saw teeth having an inclined shape and facing each other in a direction parallel to the central axis line, and wherein the second link member includes a first release portion releasing the motion constraint state of the second link member by transmitting an external force to the first ratchet member, wherein the second link member includes the first release portion transmitting an external force to the first ratchet member to release the motion constraint state of the second link member, and wherein the first release portion includes:

a first button protruding from an external side surface of the second link member and receiving an external force applied thereto; and a first operating member formed inside the second link member and supported by a first elastic member, having one surface to which the first button and the first ratchet rotating portion are fixed, and integrally moving together with the first button and the first ratchet rotating portion to separate the first ratchet rotating portion from the first ratchet base portion when an external force is applied to the first button.

16. The unit chair of claim 15, wherein the second link member includes:

a first release portion releasing the motion constraint state of the second link member by transmitting an external force to the first ratchet member; and a second release portion operating independently from the first release portion and releasing the motion constraint state of the third link member by transmitting an external force to the second ratchet member.

17. The unit chair of claim 16, wherein the first release portion releases the motion constraint state of the second link member by releasing the engagement of the saw teeth of the first ratchet member when an external force is applied, and the second release portion releases the motion constraint state of the third link member by releasing the engagement of the saw teeth of the second ratchet member when an external force is applied.

18. The unit chair of claim 15, wherein the first ratchet member includes:

a first ratchet base portion including a plurality of saw teeth formed on one surface, the plurality of saw teeth arranged in a ring shape centered on the central axis line of the first hinge pin, protruding in a direction parallel to the central axis line, and inclined only in one rotational direction, and the first ratchet base portion having an opposite surface fixed to the first link member; and a first ratchet rotating portion including a plurality of saw teeth formed on one surface and at least partially engaged with at least some of the saw teeth of the first ratchet base portion and having an opposite surface fixed to the second link member, and the second ratchet member includes:

a second ratchet base portion including a plurality of saw teeth formed on one surface, the plurality of saw teeth arranged in a ring shape centered on a central axis line of the second hinge pin, protruding in a direction parallel to the central axis line, and inclined only in one rotational direction, and the second ratchet base portion having an opposite surface fixed to the third link member; and a second ratchet rotating portion including a plurality of saw teeth formed on one surface and at least partially engaged with at least some of the saw teeth of the second ratchet base portion and having an opposite surface fixed to the second link member.

19. The unit chair of claim 18, wherein each saw tooth of each of the first ratchet base portion, the first ratchet rotating portion, the second ratchet base portion, and the second ratchet rotating portion is at an inclination angle of 40 degrees to 50 degrees only in one direction with respect to a surface on which each saw tooth is formed.

20. The unit chair of claim 19, wherein the inclination angle is 45 degrees.

21. The unit chair of claim 18, wherein any one of the number of saw teeth of the first ratchet base portion and the number of saw teeth of the first ratchet rotating portion is a multiple of 2 or greater of the other, or any one of the number of saw teeth of the second ratchet base portion and the number of saw teeth of the second ratchet rotating portion is a multiple of 2 or greater of the other.

22. The unit chair of claim 21, wherein the number of saw teeth of the first ratchet rotating portion is double the number of saw teeth of the first ratchet base portion, and the number of saw teeth of the second ratchet rotating portion is double the number of saw teeth of the second ratchet base portion.

23. The unit chair of claim 22, wherein the saw teeth of the first ratchet rotating portion and the saw teeth of the second ratchet rotating portion are provided in plurality, and each plurality is arranged in a ring shape at equiangular intervals.

24. The unit chair of claim 15, wherein the second link member is constrained in motion by the first ratchet member and is rotatable only in a direction toward a seat surface of the backrest portion, and the third link member is constrained in motion by the second ratchet member so that the third link member is rotatable only in a direction opposite to a direction in which the second link member is rotatable.

25. The unit chair of claim 18, wherein the second release portion includes:

a second button protruding from an external side surface of the second link member and receiving an external force applied thereto; and a second operating member formed inside the second link member and supported by a second elastic member, having one surface to which the second button and the second ratchet rotating portion are fixed, and integrally moving together with the second button and the second ratchet rotating portion to separate the second ratchet rotating portion from the second ratchet base portion when an external force is applied to the second button.

26. The unit chair of claim 15, wherein a surface becoming a front end when the second link member rotates in one direction, in an external surface of the second link member is recessed when observed in a direction of a central axial line of the first hinge pin.

27. The unit chair of claim 16, wherein the second link member has a "C" shape.

28. The unit chair of claim 16, wherein, when the first link member is fixed to the backrest portion, the other end portion of the second link member contacts a seat surface of the backrest portion.

29. The unit chair of claim 16, wherein at least one of the first release portion and the second release portion includes a button moving along a trace including the central axis line of the first hinge pin or the central axis line of the second hinge pin when an external force is applied.

30. The unit chair of claim 29, wherein the second release portion includes a second button moving, while pushing at least a portion of the second ratchet member, along a trace including the central axis line of the first hinge pin to release the engagement of the saw teeth of the second ratchet member to release the motion constraint state of the third link member, when an external force is applied.

31. The unit chair of claim 30, wherein the first release portion includes:

the first button moving along a trace not including the central axis line of the first hinge pin and in parallel with the central axis line of the first hinge pin, when an external force is applied; and the first operating member integrally moving with the first button to release the engagement of the first ratchet member to release the motion constraint state of the second link member when an external force is applied.

32. A unit chair comprising a link unit for adjusting a posture of a headrest, wherein the link unit includes:

a first link member fixed to a backrest portion of the unit chair;

a second link member having one end portion hinged to the first link member by a first hinge pin; and a first ratchet member formed on one surface of at least one of the first link member and the second link member, the first ratchet member comprising teeth each inclined only on one face in a rotational direction to allow rotational motion and the teeth each having no inclination on an opposite face for constraining motion of the second link member so that the second link member is rotatable only in one direction about a central axis line of the first hinge pin, wherein the second link member includes a first release portion releasing the motion constraint state of the second link member by transmitting an external force to the first ratchet member, and the first release portion includes a first deformation member changed in shape or position as an external force is applied, wherein the rotation in the one direction overcomes a bias of the first deformation member by a camming action on the one face of the teeth when no change in the motion constraint state is intended, and the external force applied to the first ratchet member effectuates a change in the motion constraint state only when a change amount of the shape or position of the first deformation member exceeds a predetermined first reference amount, wherein the first release portion includes:

a first button protruding from an external side surface of the second link member and receiving an external force applied thereto; and a first operating member formed inside the second link member and supported by a first elastic member, having one surface to which the first button and the first ratchet rotating portion are fixed, and integrally moving together with the first button and the first ratchet rotating portion to separate the first ratchet rotating portion from the first ratchet base portion when an external force is applied to the first button.

33. The unit chair of claim 32, wherein wherein the first deformation member includes the first button supported by a second elastic member, and wherein the first operating member transmits the applied external force to the first ratchet member only when the first button moves more than a first reference displacement as an external force is applied to the first button.

34. The unit chair of claim 33, wherein when the first button moves more than the first reference displacement as an external force is applied, the first operating member is in contact and interwork with the first button.

35. The unit chair of claim 34, wherein a first uplift portion penetrating a hole formed in the first operating member is formed on an inner side of a housing of the second link member, and an outer wall of the first uplift portion guides a motion direction of the first operating member, and an outer wall of the first uplift portion guides a motion direction of the first operating member.

36. The unit chair of claim 35, wherein the first uplift portion has a first guide recess guiding a motion direction of the first button.

37. The unit chair of claim 35, wherein one end of the second elastic member is connected to the first uplift portion and the other end of the second elastic member is connected to the first button to support the first button and is deformed according to a motion operation of the first button.

38. The unit chair of claim 34, wherein the first ratchet member includes:

a first ratchet base portion including a the teeth as plurality of saw teeth formed on one surface, the plurality of saw teeth arranged in a ring shape centered on the central axis line of the first hinge pin, protruding in a direction parallel to the central axis line, and inclined only in one rotational direction, and the ratchet base portion having an opposite surface fixed to the first link member; and a first ratchet rotating portion including saw teeth formed on one surface and engaged with the saw teeth of the first ratchet base portion and having an opposite surface fixed to the first operating member, and wherein the first operating member is moved together with the first button and the first ratchet rotating portion to separate the first ratchet rotating portion from the first ratchet base portion when an external force is applied to the first button.

39. The unit chair of claim 32, wherein the link unit further includes:

a third link member having one end portion hinged to the other end portion of the second link member by a second hinge pin and allowing the headrest to be fixed to one surface thereof, and a second ratchet member formed on one surface of at least one of the second link member and the third link member and constraining motion of the third link member so that the third link member is rotatable only in one direction about a central axis line of the second hinge pin, wherein the second link member further includes a second release portion operating independently from the first release portion and transmitting an external force to the second ratchet member to release a motion constraint state of the third link member, and wherein the second release portion includes a second deformation member changed in shape or position as an external force is applied, and the external force applied to the second ratchet member is transmitted only when a change amount of the shape or position of the second deformation member exceeds a predetermined second reference amount.

40. The unit chair of claim 39, wherein the second release portion further includes a second operating member formed inside the second link member and supported by a third elastic member, wherein the second deformation member includes a second button protruding from one external side surface of the second link member and supported by a fourth elastic member, and wherein the second operating member transmits the applied external force to the second ratchet member only when the second button moves more than a second reference displacement as an external force is applied to the second button.

41. The unit chair of claim 40, wherein, when the second button moves more than the second reference displacement as an external force is applied, the second operating member is in contact and interwork with the second button, wherein the second ratchet member includes:

a second ratchet base portion including a plurality of saw teeth formed on one surface, the plurality of saw teeth arranged in a ring shape centered on a central axis line of the second hinge pin, protruding in a direction parallel to the central axis line, and inclined only in one rotational direction, and the second ratchet base portion having an opposite surface fixed to the third link member; and a second ratchet rotating portion including saw teeth formed on one surface and engaged with the saw teeth of the second ratchet base portion and having an opposite surface fixed to the second operating member, and wherein the second operating member is moved together with the second button and the second ratchet rotating portion to separate the second ratchet rotating portion from the second ratchet base portion when an external force is applied to the second button.

42. The unit chair of claim 39, wherein the second link member is constrained in motion by the first ratchet member and is rotatable only in a direction toward a seat surface of the backrest portion, and the third link member is constrained in motion by the second ratchet member so that the third link member is rotatable only in a direction opposite to a direction in which the second link member is rotatable.

* * * * *